United States Patent
Ray et al.

(10) Patent No.: US 11,875,231 B2
(45) Date of Patent: Jan. 16, 2024

(54) SYSTEM AND METHOD FOR COMPLEX TASK MACHINE LEARNING

(71) Applicant: Samsung Electronics Co., Ltd., Suwon-si (KR)

(72) Inventors: Avik Ray, Sunnyvale, CA (US); Yilin Shen, Santa Clara, CA (US); Hongxia Jin, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 851 days.

(21) Appl. No.: 16/661,827

(22) Filed: Oct. 23, 2019

(65) Prior Publication Data
US 2020/0410395 A1 Dec. 31, 2020

Related U.S. Application Data

(60) Provisional application No. 62/866,997, filed on Jun. 26, 2019.

(51) Int. Cl.
| | |
|---|---|
| G06F 15/16 | (2006.01) |
| G06F 9/54 | (2006.01) |
| H04L 29/06 | (2006.01) |
| G06N 20/00 | (2019.01) |
| G06N 5/02 | (2023.01) |

(52) U.S. Cl.
CPC .............. G06N 20/00 (2019.01); G06N 5/02 (2013.01)

(58) Field of Classification Search
CPC ....... G06N 20/00; G06N 5/02; G10L 15/1822
USPC ........................................................ 709/221
See application file for complete search history.

(56) References Cited

U.S. PATENT DOCUMENTS

| | | | |
|---|---|---|---|
| 7,149,690 B2 | 12/2006 | August et al. | |
| 8,286,188 B1 * | 10/2012 | Brief ................... | G06F 13/1663 |
| | | | 719/314 |
| 8,407,057 B2 | 3/2013 | Comerford et al. | |
| 8,484,025 B1 | 7/2013 | Moreno Mengibar et al. | |
| 8,738,377 B2 | 5/2014 | Byrne et al. | |
| 8,738,379 B2 | 5/2014 | Tur | |

(Continued)

OTHER PUBLICATIONS

International Search Report and Written Opinion of the International Searching Authority dated Jul. 15, 2020 in connection with International Patent Application No. PCT/KR2020/004645, 10 pages.

(Continued)

*Primary Examiner* — Hamza N Algibhah

(57) ABSTRACT

An electronic device for complex task machine learning includes at least one memory and at least one processor coupled to the at least one memory. The at least one processor is configured to receive an unknown command for performing a task and generate a prompt regarding the unknown command. The at least one processor is also configured to receive one or more instructions in response to the prompt, where each of the one or more instructions provides information on performing at least a portion of the task. The at least one processor is further configured to determine at least one action for each one of the one or more instructions. In addition, the at least one processor is configured to create a complex action for performing the task based on the at least one action for each one of the one or more instructions.

20 Claims, 13 Drawing Sheets

(56) References Cited

U.S. PATENT DOCUMENTS

| | | | |
|---|---|---|---|
| 8,819,155 B2 * | 8/2014 | Ocher | G06F 9/547 709/206 |
| 10,102,845 B1 * | 10/2018 | Abu Zaki | G10L 15/26 |
| 10,249,296 B1 * | 4/2019 | Mutagi | G10L 15/1822 |
| 10,726,507 B1 * | 7/2020 | Thouzeau | G06Q 50/04 |
| 10,755,046 B1 * | 8/2020 | Lewis Meza | G06F 40/205 |
| 10,854,191 B1 * | 12/2020 | Geramifard | G10L 15/01 |
| 10,991,373 B1 * | 4/2021 | Wang | G06F 21/31 |
| 11,132,504 B1 * | 9/2021 | Mont-Reynaud | G06F 40/30 |
| 11,132,509 B1 * | 9/2021 | Pasko | G06F 18/214 |
| 11,176,930 B1 * | 11/2021 | Bliss | G10L 15/22 |
| 11,176,934 B1 * | 11/2021 | Venkatesh Raman | G10L 15/32 |
| 11,182,556 B1 * | 11/2021 | Lewis Meza | H04L 51/02 |
| 11,315,552 B1 * | 4/2022 | George | G06F 40/279 |
| 2002/0135618 A1 * | 9/2002 | Maes | G06V 40/165 715/767 |
| 2006/0057545 A1 | 3/2006 | Mozer et al. | |
| 2008/0262848 A1 | 10/2008 | Shienbrood et al. | |
| 2009/0144609 A1 * | 6/2009 | Liang | G06F 40/284 707/999.005 |
| 2009/0299745 A1 | 12/2009 | Kennewick et al. | |
| 2010/0205606 A1 * | 8/2010 | Panzer | G06F 9/4484 718/102 |
| 2011/0184730 A1 | 7/2011 | LeBeau et al. | |
| 2012/0240062 A1 * | 9/2012 | Passmore | H04L 51/52 715/758 |
| 2013/0173523 A1 * | 7/2013 | Sanchez | G06N 5/02 706/50 |
| 2014/0201629 A1 | 7/2014 | Heck | |
| 2014/0244253 A1 | 8/2014 | Bringert et al. | |
| 2014/0253455 A1 | 9/2014 | Mauro et al. | |
| 2014/0350304 A1 | 11/2014 | Wu et al. | |
| 2016/0259654 A1 * | 9/2016 | Nychis | G06F 9/45533 |
| 2016/0260029 A1 | 9/2016 | Gelfenbeyn et al. | |
| 2016/0321108 A1 * | 11/2016 | Xue | G06F 9/5027 |
| 2016/0379139 A1 * | 12/2016 | Eldar | G06F 16/285 706/12 |
| 2017/0200455 A1 | 7/2017 | Aggarwal et al. | |
| 2017/0242886 A1 | 8/2017 | Jolley et al. | |
| 2017/0344887 A1 * | 11/2017 | Ahmed | G06N 20/00 |
| 2017/0364336 A1 * | 12/2017 | Khan | G06F 40/35 |
| 2018/0068657 A1 | 3/2018 | Khan et al. | |
| 2018/0089572 A1 * | 3/2018 | Aili | G06F 9/453 |
| 2018/0247648 A1 * | 8/2018 | Nadimpalli | G10L 15/22 |
| 2019/0019112 A1 | 1/2019 | Gelfenbeyn et al. | |
| 2019/0042988 A1 * | 2/2019 | Brown | G06N 5/022 |
| 2019/0115015 A1 | 4/2019 | Yae | |
| 2019/0129938 A1 * | 5/2019 | Yao | H04L 12/282 |
| 2019/0164061 A1 * | 5/2019 | Freed | G06N 20/00 |
| 2019/0324795 A1 * | 10/2019 | Gao | G06F 9/4843 |
| 2020/0211560 A1 * | 7/2020 | Lei | H04M 3/50 |
| 2020/0227025 A1 * | 7/2020 | DiMascio | G10L 15/22 |
| 2021/0065708 A1 * | 3/2021 | Nishikawa | G10L 15/22 |
| 2021/0383798 A1 * | 12/2021 | Zhang | G06F 16/3329 |

OTHER PUBLICATIONS

Extended European Search Report in connection with counterpart European Patent Application No. 20831991.3 dated Apr. 22, 2022, 7 pages.

\* cited by examiner

| Attribute | Description | Example |
|---|---|---|
| Category | Name of API category | Messages |
| Action | Action performed by API in category | Send |
| Description | API description | Sends the specified message to the recipients in the To, Cc, and Bcc headers |
| URI | API call URI | https://www.googleapis.com/upload/gmail/v1/users/userid/messages/send |
| Parameters | API call parameters | userid, uploadtype, raw message . . . |
| Response | Response object template | message resource object |
| Fulfillment | Wrapper function for API call | sendMessage() |

FIG. 8

SYSTEM AND METHOD FOR COMPLEX TASK MACHINE LEARNING

CROSS-REFERENCE TO RELATED APPLICATION AND CLAIM OF PRIORITY

This application claims priority under 35 U.S.C. § 119(e) to U.S. Provisional Patent Application No. 62/866,997 filed on Jun. 26, 2019 and entitled "Method to Learn Complex Tasks." This provisional patent application is hereby incorporated by reference in its entirety.

TECHNICAL FIELD

This disclosure relates generally to machine learning systems. More specifically, this disclosure relates to a system and method for complex task machine learning.

BACKGROUND

Natural language understanding (NLU) is a key component of modern digital personal assistants (PA) to enable them to convert a user's natural language (NL) commands to actions. Digital personal assistants can typically perform a limited set of simple tasks/actions in different applications on a single device. To enable these application actions to be invoked via natural language commands, developers build NLU skills corresponding to actions for individual applications. However, complex tasks or actions that require multiple applications, devices, and the transfer of context information across applications are generally not supported by NLU skills.

SUMMARY

This disclosure provides a system and method for complex task machine learning.

In a first embodiment, a method for complex task machine learning includes receiving an unknown command for performing a task and generating a prompt regarding the unknown command. The method also includes receiving one or more instructions in response to the prompt, where each of the one or more instructions provides information on performing at least a portion of the task. The method further includes determining at least one action for each one of the one or more instructions. In addition, the method includes creating, by at least one processor, a complex action for performing the task based on the at least one action for each one of the one or more instructions.

In a second embodiment, an electronic device for complex task machine learning includes at least one memory and at least one processor coupled to the at least one memory. The at least one processor is configured to receive an unknown command for performing a task and generate a prompt regarding the unknown command. The at least one processor is also configured to receive one or more instructions in response to the prompt, where each of the one or more instructions provides information on performing at least a portion of the task. The at least one processor is further configured to determine at least one action for each one of the one or more instructions. In addition, the at least one processor is configured to create a complex action for performing the task based on the at least one action for each one of the one or more instructions.

In a third embodiment, a non-transitory computer readable medium embodies a computer program. The computer program includes instructions that when executed cause at least one processor of an electronic device to receive an unknown command for performing a task and generate a prompt regarding the unknown command. The computer program also includes instructions that when executed cause the at least one processor to receive one or more instructions in response to the prompt, where each of the one or more instructions provides information on performing at least a portion of the task. The computer program further includes instructions that when executed cause the at least one processor to determine at least one action for each one of the one or more instructions. In addition, the computer program includes instructions that when executed cause the at least one processor to create a complex action for performing the task based on the at least one action for each one of the one or more instructions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 8 illustrates an example set of API meta-information in accordance with various embodiments of this disclosure;

DETAILED DESCRIPTION

Figure 1:
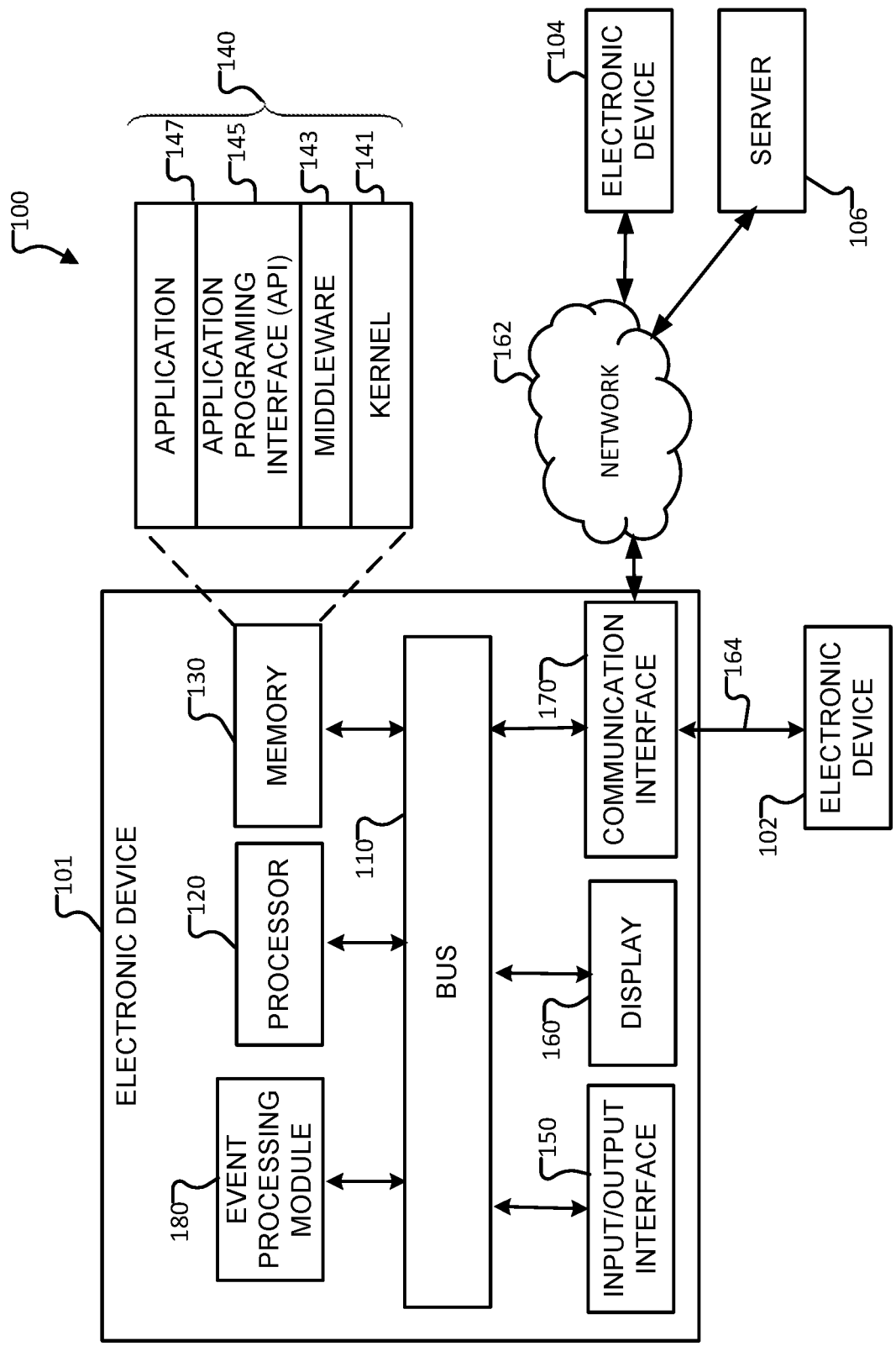
FIG. 1 illustrates an example network configuration in accordance with various embodiments of this disclosure.

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, existing digital personal assistants typically perform only a limited set of simple tasks or actions in different applications on a single device. To enable these application actions to be invoked via natural language commands, developers build natural language understanding (NLU) skills corresponding to actions for individual applications. However, complex tasks or actions that require multiple applications, devices, and the transfer of context information across applications are generally not supported by NLU skills. Existing approaches that enable the teaching of complex tasks allow users to use only a limited number of pre-defined actions within each application, even when an application supports a multitude of public application programming interfaces (APIs). Moreover, these approaches require users to manually search for and select these actions, which is highly cumbersome.

Various embodiments of this disclosure provide a system having a learning agent configured to be taught to recognize complex tasks that would not otherwise be recognizable by a personal assistant (PA) service or NLU service. In some embodiments, the learning agent, upon recognizing that a complex task is not known, can prompt a user via an agent user interface for clarifying instructions that can provide each step for performing the complex task. The learning agent can process each clarifying instruction to determine how to perform the complex task, including determining which application(s) to use for the complex task, which action(s) for each application to perform, and the slot(s) or parameter(s) for each action. Dependencies between actions can be created to customize the complex task and to provide an integration between each action, such as by using information obtained via one or more actions and their associated parameters in a subsequent action of the complex task. Once each clarifying instruction is processed, a complex task object can be created and saved to perform the same or similar action in the future.

In some embodiments of this disclosure, to create each action of a complex action, pre-built application-specific skills (such as skills provided by application developers) can be provided and stored in association with the learning agent. When determining an action for a new complex task, the learning agent can use the pre-built skills to assign application-specific actions. Also, in some embodiments, a set of APIs for various applications can be stored in a knowledge base in a standardized format so that actions can be created from the APIs, helping to support additional functions provided by an application that may not be one of the pre-built skills for the application.

Various embodiments of this disclosure also include a complex task learning system for multi-device complex tasks. The complex task learning system for multi-device complex tasks can receive utterances related to tasks intended to involve multiple devices, such as multiple smart devices like smart televisions, smartphones, smart watches or other wearables, smart refrigerators, smart ovens, other smart appliances, and/or other smart devices. The complex task learning system for multi-device complex tasks includes a learning agent that can, upon recognizing that a multi-device complex task is not known, prompt a user via an agent user interface for clarifying instructions that can provide each step for performing the multi-device complex task. The learning agent can process each clarifying instruction to determine how to perform the complex task, including determining which devices to use for the complex task, applications on those devices to use for the complex task, which actions for each application to perform, and the slot(s) or parameter(s) for each action. A multi-device complex task object can be created and saved so that the same or similar task using multiple devices can be performed in the future. Various embodiments of this disclosure further provide for more efficient natural language instruction processing, with various embodiments of this disclosure outperforming baseline algorithms from certain datasets.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can receive utterances, determine if a task or command in an utterance is known, issue prompts for clarifying instructions, process clarifying instructions to determine applications, actions, parameters, devices, or other criteria for performing the clarifying instructions, build a complex task based on the processed clarifying instructions, or perform other tasks.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). In some embodiments, the memory 130 can be an external memory used by a model, which may be stored on the electronic device 101, an electronic device 102, an electronic device 104, or a server 106.

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include an application that receives utterances, determines if a task or command in an utterance is known, issues prompts for clarifying instructions, processes clarifying instructions to determine applications, actions, parameters, devices, or other criteria for performing the clarifying instructions, builds a complex task based on the processed clarifying instructions, or perform other tasks.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control. In some embodiments, the API 145 includes an API and action knowledge base that is used to provide pre-built or buildable actions based on previously stored actions or based on application APIs stored in a standardized format.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as signals received by the communication interface 170 regarding natural language queries or utterance, signals regarding determined intent and slot tags, signals regarding actions to be performed based on a natural language query, signals regarding or including clarifying instructions, signals from input on an agent user interface, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
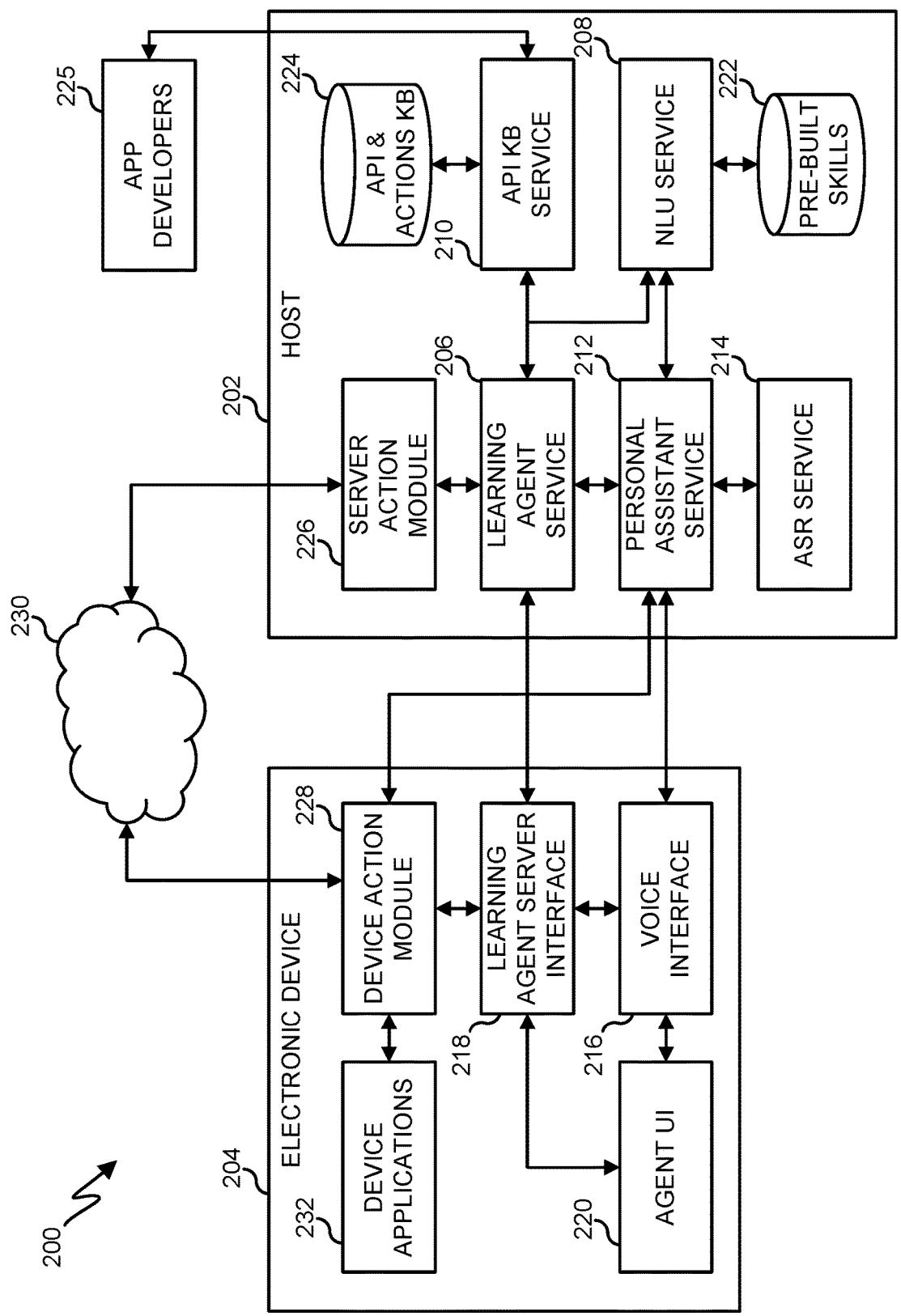
FIG. 2 illustrates an example complex task learning system architecture in accordance with various embodiments of this disclosure.

FIG. 2 illustrates an example complex task learning system architecture 200 in accordance with various embodiments of this disclosure. The architecture 200 includes at least one host device 202 and at least one electronic device 204. In some embodiments, the host device 202 can be the server 106, and the electronic device 204 can be the electronic device 101. In some embodiments, the host device 202 and the electronic device 204 can be a same device or entity. The host device 202 includes a learning agent service 206 that utilizes a natural language understanding (NLU) service 208 and an application programming interface (API) knowledge base (KB) service 210 to learn to perform complex tasks provided in NLU commands from a personal assistant (PA) service 212 executed by the host device 202. The PA service 212 cooperates with an automated speech recognition (ASR) service 214 to receive queries or utterances from the electronic device 204. In various embodiments of this disclosure, the NLU service 208 can include a probabilistic NLU model, such as a neural network, that is used to determine the intent of natural language (NL) utterances, such as the domains, applications intended to be used, and actions to be performed, and fills slot or parameter values for the utterances.

The electronic device 204 includes a speech/voice interface 216 configured to receive queries or utterances from a user of the electronic device 204 that are transmitted to the host device 202 at the PA service 212. The PA service 212 can use the NLU service 208 to parse NL utterances received by the PA service 212, and the PA service 212 can cause various tasks to be performed. If an utterance received from the electronic device 204 by the PA service 212 cannot be understood or effectively parsed by the NLU service 208 or if the utterance is otherwise unknown to the host device 202, the learning agent service 206 can be used to teach the complex task in the utterance to the host device 202. A learning agent server interface 218 on the electronic device 204 can communicate with the learning agent service 206 to provide information to the learning agent service 206, informing the learning agent service 206 how to complete a new complex task.

As an example of this functionality, in various embodiments of this disclosure, an agent user interface (UI) 220 can be displayed on the electronic device 204 that allows a user of the electronic device 204 to provide clarifying instructions to the learning agent service 206 that teach the learning agent service 206 how to complete an unrecognized complex task included in an utterance received from the electronic device 204 by the PA service 212 of the host device 202. When a complex task in an utterance received by the PA service 212 is unrecognized, the learning agent service 206 can transmit a command to the learning agent server interface 218 to display a prompt in the agent UI 220 asking the user to provide additional information regarding the complex task. The user can provide clarifying instruction in various formats. For example, suppose a user wants to accomplish the complex task of scheduling an event using three separate applications, a restaurant search application, a calendar application, and an email application, such as "schedule a dinner with Alice in a Thai restaurant next Monday." Upon a failure to understand the intent or task corresponding to this command, the PA service 212 and the learning agent service 206 prompt the user via the agent UI 220 to teach this task to the PA service 212 and the learning agent service 206. In some embodiments, the user can initiate the teaching of a new task by opening the agent UI 220 and providing commands, such as NL commands or utterances, to teach the task.

When teaching the PA service 212 and the learning agent service 206 how to perform a complex task, the user can provide one or more additional utterances that each provide one step in the complex task to be performed. This allows the PA service 212 and the learning agent service 206 to perform each individual task in each of the additional clarifying utterances and build and store a new complex task that performs each individual task. To build the new complex action, the learning agent service 206 can use the NLU service 208 to parse the clarifying instructions and determine which applications to use for the clarifying instructions, which actions to perform based on the clarifying instructions and the determined applications, and the parameters, such as slots, for the actions. In some embodiments, the NLU service 208 can determine each action from a set of pre-built skills 222. Each pre-built skill can be associated with a specific application and can be defined and provided by a developer of the specific application, such as by providing pre-built skills using PA skill development tools available to the developers that ensure the pre-built skills are compatible with the PA service 212 and recognizable by the NLU service 208.

In some embodiments, to determine an action for a clarifying instruction, the learning agent service 206 can use the API KB service 210 to access an API and actions knowledge base 224 that includes various API calls for specific applications, which can be used to build new skills for clarifying instructions. Application developers 225 can register their APIs in the API and actions knowledge base 224, such as via an API knowledge base's web service or a standalone integrated development environment (IDE). Each application developer 225 can also implement a wrapper function according to a standardized format of the API and actions knowledge base 224.

As each clarifying instruction is processed, the host device 202 can cause each individual task to be performed by a server action module 226. The server action module 226 of the host device 202 communicates with a device action module 228 of the electronic device 204 over a network or cloud 230. It will be understood that other components can also communicate over a network in a similar manner, such as the components 206, 212, 216, and 218. The server action module 226 transmits a command to the device action module 228 to perform an action, which can also be a complex task if the server action module 226 is commanding the device action module 228 to perform a previously-learned complex task. In response, the device action module 228 instructs one or more device applications 232 stored and executed by the electronic device 232 to perform the action.

When each action for each clarifying instruction provided by the user is determined and performed, a complex task object can be created that includes commands for executing each individual action of the complex task. The complex task object can be stored by the host device 202. When the PA service 212 receives a subsequent utterance that is the same as or similar to the stored complex task, the PA service 212 can cause the complex task to be performed without further input from the user. In some embodiments, to provide clarifying instructions, the user can select a clarifying instruction from a list displayed in the agent UI 220 of possible clarifying instructions. Also, in some embodiments, the user can provide clarifying instructions by inputting a command, such as a sentence or other utterance, into a text input area of the agent UI 220.

Although FIG. 2 illustrates one example of a complex task learning system architecture 200, various changes may be made to FIG. 2. For example, in the complex task learning system architecture 200, the PA service 212 may include one or more of the server action module 226, learning agent service 206, ASR service 214, or NLU service 208 as part of the functionality of the PA service 212. Also, the functionality of the voice interface 216, learning agent server interface 218, agent UI 220, and device action module 228 can be included within a single entity. In addition, the API and actions knowledge base 224 and the set of pre-built skills 222 can be included within separate data stores or databases, or in the same data store or database.

Figure 3:
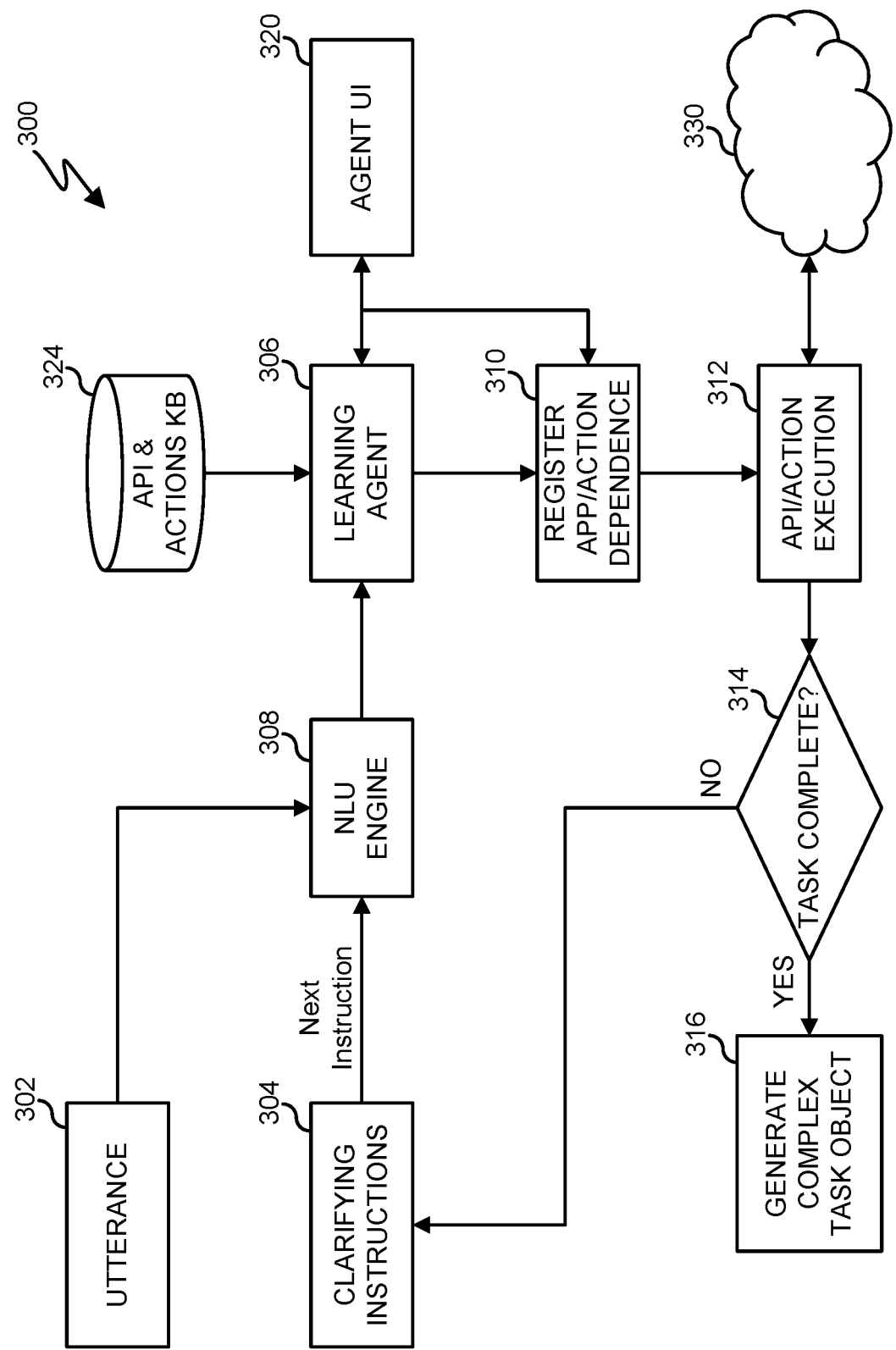
FIG. 3 illustrates an example complex task learning agent system in accordance with various embodiments of this disclosure.

FIG. 3 illustrates an example complex task learning agent system 300 in accordance with various embodiments of this disclosure. The system 300 includes a learning agent 306 configured to learn complex tasks. In some embodiments, the learning agent 306 can be the learning agent service 206 of FIG. 2. An utterance 302, such as an utterance received by a PA service like the PA service 212, that includes an instruction to perform a complex task is received by an NLU engine 308. If the complex task included in the utterance 302 is not known to, or is deemed to be undeterminable by, the NLU engine 308, the learning agent 306 can prompt a user for clarifying instructions, such as via an agent UI 320. In response to the prompt, the user can provide a clarifying instruction 304 to the NLU engine 308 that provides a step for performing the complex task.

As an example of this functionality, if the utterance 302 includes the utterance "schedule a dinner with Alice in a Thai restaurant next Monday," the user can be informed via the agent UI 320 that the complex task is unknown and prompted to provide one or more clarifying instructions. For instance, to teach the learning agent 306 how to schedule a dinner with Alice at a Thai restaurant on Monday, the user can provide three clarifying instructions 304 of "search a Thai restaurant for dinner," "schedule a dinner next Monday," and "share the event with Alice via email." In some embodiments, the user can provide one clarifying instruction 304 at a time, where the learning agent 306 processes each clarifying instruction 304 and prompts the user for a next clarifying instruction 304. In other embodiments, the user can provide all clarifying instructions 304 in response to a single prompt, with the learning agent 306 processing each one in turn until the complex task is created. Also, in some embodiments, to further assist the learning agent 306 in performing a task associated with each clarifying instruction 304, the user can include in one or more of the clarifying instructions 304 the name of the application to use for the action. If a user does not provide the name of the application, the NLU engine 308 can attempt to determine the application to be used based on the utterance of the clarifying instruction 304. The complex task can be created using the clarifying instructions 304 by determining the application to use based on each clarifying instruction and performing each subtask, action, or API call for each clarifying instruction 304 using an application. It will be understood that, depending on the specific clarifying instructions 304 provided, multiple actions may be performed by the same application.

The system 300 further includes a register app/action dependence module 310 that processes each clarifying instruction 304 to understand the application, action, and parameter(s) for the clarifying instruction 304 and registers any dependencies for the action in the complex task, such as by registering that a second action for a second received clarifying instruction 304 is dependent on a first action for a first received clarifying instruction 304. The register app/action dependence module 310 can also receive additional input via the agent UI 320 to provide selections for different applications, actions, parameters, or dependencies for actions. After the register app/action dependence module 310 determines the application, action, parameters, and dependencies for a clarifying instruction 304, an API/action execution module 312 performs the action for the clarifying instruction 304, such as by transmitting a command to perform the determined action over a network 330 to an electronic device. For example, as shown in FIG. 2, the network 330 can be the network 230, and the API/action execution module 312 can be performed by the server action module 226 to transmit a command to perform the action from the host device 202 over the network 230 to a device action module 228 of the electronic device 204 for performance by a device application 232.

After execution of the action for the clarifying instruction 304, at decision block 314, the learning agent 306, such as via a processor 120 of the host device 202, determines whether the complex task is complete. If not, a next clarifying instruction 304 is processed by the NLU engine 308 and the learning agent 306 to determine an action to perform for the next clarifying instruction 304. Each clarifying instruction 304 is handled in this manner until, at decision block 314, the learning agent 306 determines that the complex task is complete. At block 316, a complex task object is generated that provides a recipe or set of instructions, scripts, or programs that can be executed to perform the new complex task in the future. The new complex task object can be stored in an action database hosted by a server, such as the host device 202, and/or a user's electronic device, such as the electronic device 204.

Although FIG. 3 illustrates one example of a complex task learning agent system 300, various changes may be made to FIG. 3. For example, decision block 314 may not be performed in the system 300, such as when all clarifying instructions 304 are processed simultaneously. Also, the API/action execution module 312 may not perform each action of each clarifying instruction 304 until each action for each clarifying instruction 304 is determined by the learning agent 306 and the register app/action dependence module 310. Further, the API and actions knowledge base 324 can also include pre-built skills for applications, such as the set of pre-built skills 222.

Figure 4:
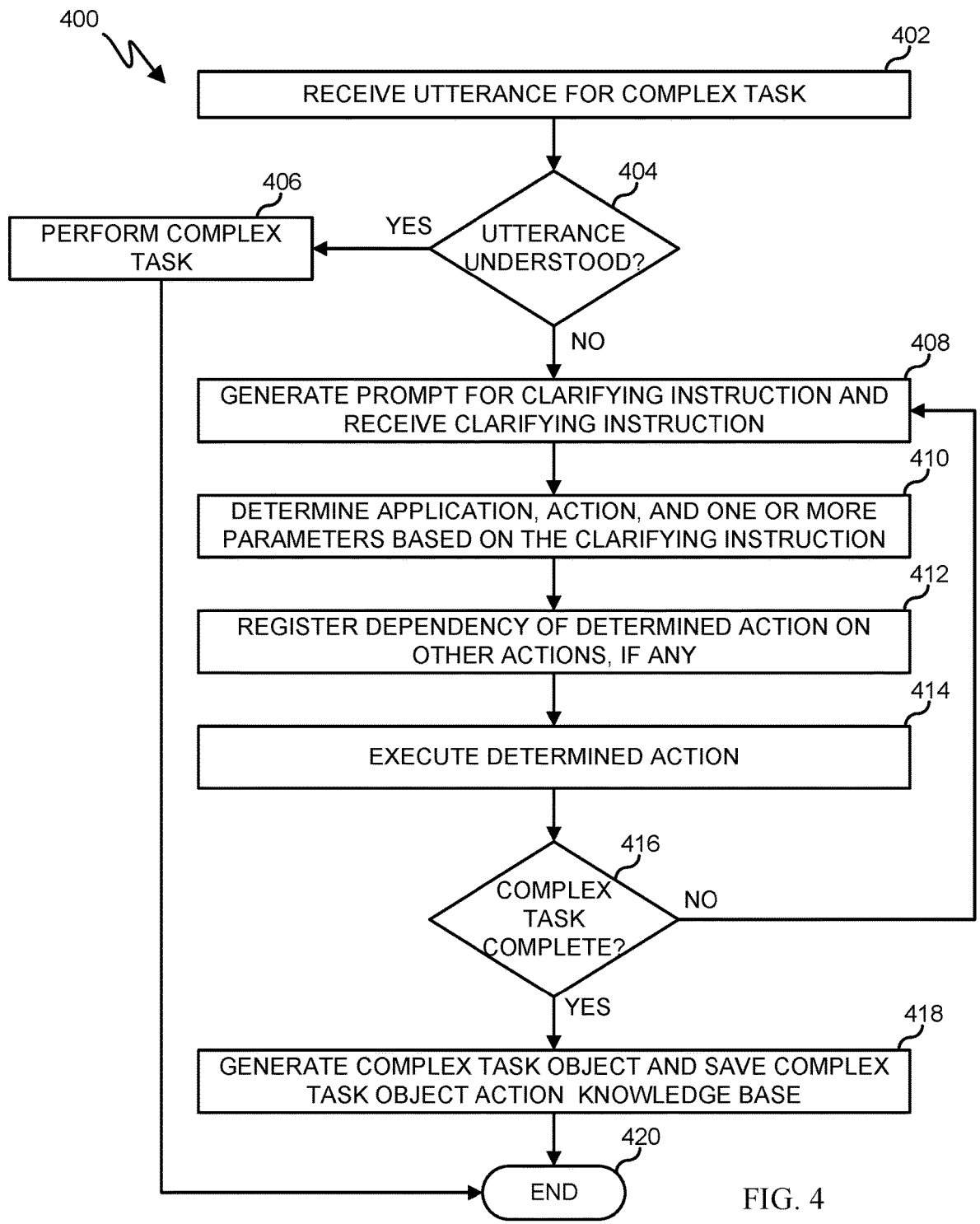
FIG. 4 illustrates an example complex task learning process in accordance with various embodiments of this disclosure.

FIG. 4 illustrates an example complex task learning process 400 in accordance with various embodiments of this disclosure. For ease of explanation, the process 400 may be described as being executed or otherwise used by the processor(s) 120 of any of the electronic devices 101, 102, 104 or the server 106 in FIG. 1. However, the process 400 may be used by any suitable device(s) and in any suitable system. The process 400 can be used with a complex task learning system as described with respect to the various embodiments of this disclosure, such as the system architecture 200 and/or the system 300.

At block 402, a processor receives an utterance that includes a command to perform a complex task. At decision block 404, the processor determines if the command is understood. If so, at block 406, the processor performs the complex task corresponding to the received utterance. For example, if the utterance includes an utterance of "schedule a dinner with Alice in a Thai restaurant next Monday" and a complex task for this type of utterance has already been created in a previous complex task learning process, the processor may already recognize this type of complex action, and a previously-created and stored complex task object can be retrieved and executed to fulfill the complex task corresponding to the received utterance. At that point, the process 400 ends at block 420.

If the processor determines that the utterance is not understood at decision block 404, the process 400 moves to block 408. At block 408, the processor generates a prompt for a clarifying instruction and receives a clarifying instruction in response to the prompt. At block 410, the processor determines an application, action, and one or more parameters based on the clarifying instruction. At block 412, the processor registers any dependencies for the action. For example, if a previous action for a previous clarifying instruction has already been determined, the processor can register the next action for the next clarifying instruction at block 412 as being dependent on the first action or on a parameter of the first action. As a particular example, if the processor determines that the first action for the first instruction is to search for a Thai restaurant using a restaurant search application, the processor can determine, or receive an input from a user to use, the restaurant information for a found Thai restaurant during the second action. If the second action is an action to email a calendar invite to another user inviting the other user to eat dinner at the Thai restaurant, the body of the email can be set to include the restaurant information obtained using the restaurant search application. The processor can therefore set a dependency for the second action to include restaurant information retrieved using the first action in the email body. Registering of dependencies thus allows for a complex task to share information between different actions of the complex task (even across applications). In this way, the complex task does not just perform a series of separate actions but rather performs a task that is customized by the different actions and their associated applications and parameters. At that point, the process 400 moves to block 414.

At block 414, the processor executes the action determined at block 410 based on the determined application and determined parameter(s) or slot(s) for the action. At decision block 416, the processor determines if the complex task is complete, such as if each clarifying instruction has been processed. If not, the processor loops back to block 408 to prompt the user for the next clarifying instruction. Once each clarifying instruction is processed and executed, the processor determines that the complex task is complete at decision block 416. If so, the process 400 moves to block 418. At block 418, the processor generates a complex task object and saves the complex task object, including the learned actions and dependencies, in an action knowledge base so that the complex action can be performed again when an utterance including the same or similar complex task command is received. The process 400 ends at block 420.

Although FIG. 4 illustrates one example of a complex task learning process 400, various changes may be made to FIG. 4. For example, while shown as a series of steps, various steps in FIG. 4 can overlap, occur in parallel, occur in a different order, or occur any number of times. Also, even though a user may have previously created a complex task, the user may no longer wish for the same applications, actions, and/or parameters to be used again for this type of complex task. As a particular example, the user may wish for a different email application to be used, other than the email application previously used to create a stored complex task object. In that case, the processor can output a prompt to the user verifying if a previously-created and stored complex task object is to be used for a complex task contained in the utterance received in block 402. If not, the process can begin creating a new complex task. Further, the processor can modify a previously-created and stored complex task object by deleting old data and adding new data, such as by deleting an identifier for one email application that is no longer to be used and adding an identifier for another new email application that is to be used. In addition, the processor at block 408 can generate a prompt to receive multiple clarifying instructions at the same time, and the multiple clarifying instructions can be processed sequentially, simultaneously, or in any other suitable manner in the manner shown in FIG. 4 (in which case step 416 can be omitted).

Figure 5:
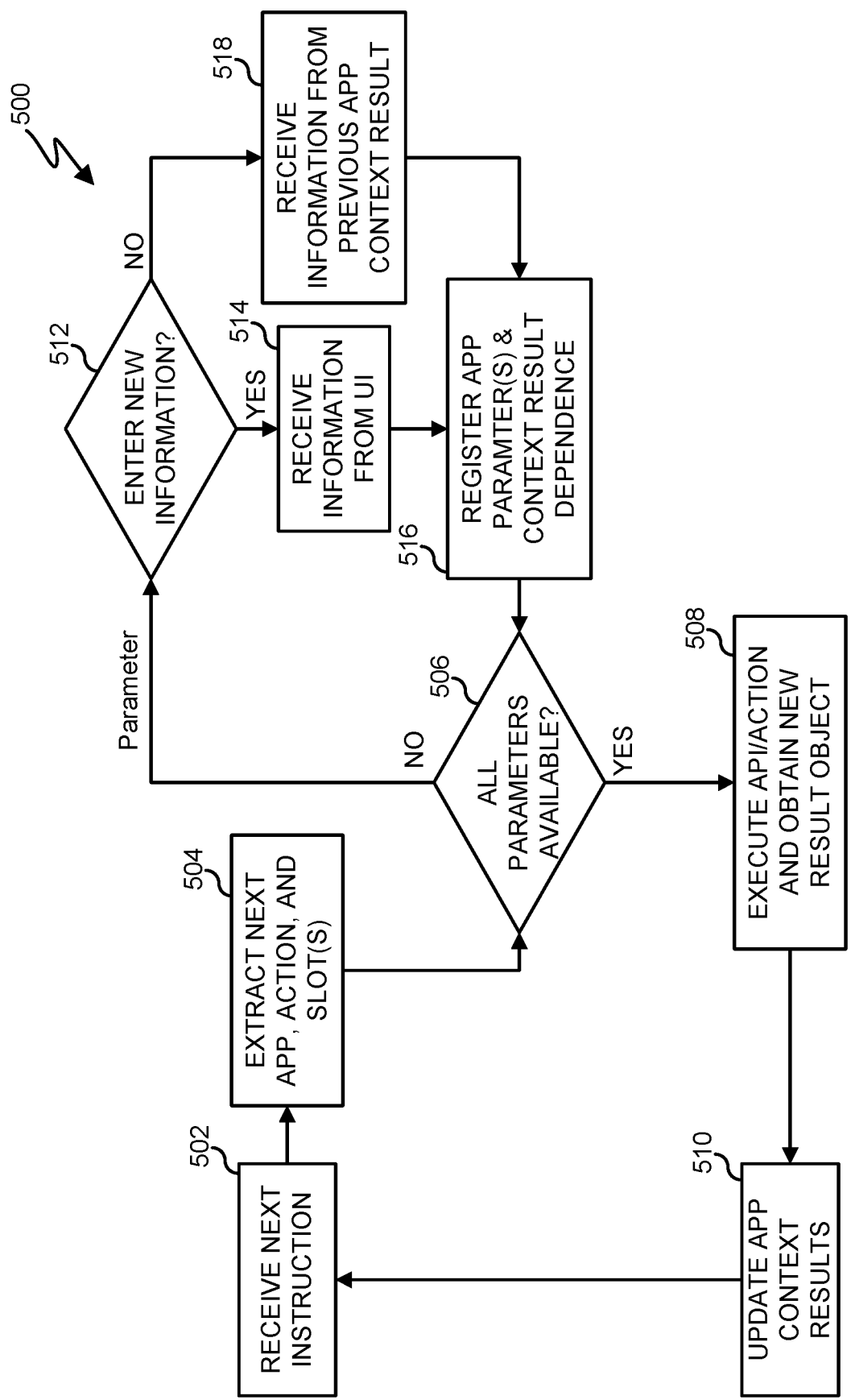
FIG. 5 illustrates an example application and action registration process in accordance with various embodiments of this disclosure.

FIG. 5 illustrates an example application and action registration process 500 in accordance with various embodiments of this disclosure. For ease of explanation, the process 500 may be described as being executed or otherwise used by the processor(s) 120 of any of the electronic devices 101, 102, 104 or the server 106 in FIG. 1. However, the process 500 may be used by any suitable device(s) and in any suitable system. The process 500 can be used with a complex task learning system as described with respect to the various embodiments of this disclosure, such as the system architecture 200 and/or the system 300. In some embodiments, the process 500 is included in or performed by or using the register app/action dependence module 310.

At block 502, a processor receives a next clarifying instruction provided in response to a prompt for learning a complex task. For example, for an utterance of "schedule a dinner with Alice in a Thai restaurant next Monday," the processor can issue a prompt for clarifying instructions on how to perform this task. As a particular example, the user can provide a series of clarifying instructions, such as "search a Thai restaurant for dinner" as a first clarifying instruction, "schedule a dinner next Monday" as a second clarifying instruction, and "share the event with Alice via email" as a third clarifying instruction. The clarifying instructions can be received together, one at a time, or in any other suitable manner. A new prompt for each next instruction can be issued, and the next instruction is received at block 502 when the process 500 loops back to block 502 after processing a previous instruction.

At block 504, the processor determines for the instruction which application to use, an action or API call to use, and one or more parameters such as one or more slot (key, value) pairs to use for the action. In some embodiments, determining the application, action, and parameters can be performed using an NLU engine. At decision block 506, the processor determines if all parameters to perform the action were extracted at block 504. If so, the process 500 moves to block 508. At block 508, the processor executes the action in accordance with its parameters and generates a new result object. At block 510, application context results are updated with the new result object. The new result object is added to a set of context information for the complex task from previous actions or API calls and result returns. The new result object can be used to created dependencies between applications or actions when processing subsequent clarifying instructions. As one example, the new result object for a first clarifying instruction of "search a Thai restaurant for dinner" can include that the determined application is a restaurant search application, the action or API call is to perform a search, and the parameters include "Thai" and associated slot tag(s) for the parameter. As another example, the new result object for a second clarifying instruction of "schedule a dinner next Monday" can include that the determined application is a calendar application, the action or API call is to create a calendar entry, and the parameters include calendar entry specifics such as date, time, and location, and associated slot tag(s) for the parameters. The process 500 can loop back to block 502 to process a next clarifying instruction. If there are no additional clarifying instructions, the process 500 ends. Upon ending the process 500, each clarifying instruction will have a determined application, action, and parameter(s), and a complex task object can be built for future tasks.

If the processor determines that not all parameters are available to carry out the task at decision block 506, the process 500 moves to decision block 512. For example, if a third clarifying instruction of "share the event with Alice via email" is received at block 504, an email body or message parameter may not have been extracted using the NLU engine. If so, the processor determines this parameter used to perform an action of sending a calendar invite via email is missing at decision block 506. At decision block 512, the processor determines if the user enters new information. In some embodiments, the agent UI 220 or 320 can issue a prompt to the user to enter a parameter value for the missing parameter, such as by providing a text input field. The prompt can also include an option to select context information for the parameter. In some embodiments, the agent UI 220 or 320 can display all context information results returned from previous actions or API calls, such as restaurant information from a previously-performed restaurant search for a previous clarifying instruction, as well as slot values from current and previous instructions. The user can choose whether to provide new information or select context information to be used for the missing parameter.

If the processor determines the user is to enter new information at decision block 512, at block 514, the processor receives new information from the user, such as information entered into the agent UI 220. For example, if the email body parameter is missing, the user can enter the text to be included in the email body at block 514, which can be used as the parameter value. At block 516, the processor registers a dependency for the input application parameter on previous action or API call context results, if any. For example, if the user chooses to input the body for the email sharing the Thai event with Alice, the processor can register that, for this complex action, the body for the email is to be a user input. The process 500 loops back to decision block 506 to determine if any other parameters are missing.

If the processor determines that new information is not to be entered by the user at decision block 512, the process 500 moves to block 518. At block 518, the processor receives information selected by the user from previous application context results. For example, if the current clarifying instruction is "share the event with Alice via email" and the missing parameter is the email body, the user can be presented with the various returned results and slot values for previous instructions. One of these options can be restaurant information returned from a restaurant search application for a previous action. If the user selects this restaurant information, the processor can receive that selection for the restaurant information to be used as the email body and use this information as the parameter when executing the action at block 508. At block 516, the processor registers the application parameters and context result dependency for this selection such that subsequent performances of this complex task will also use returned restaurant information as the email body parameter. For example, this dependency can be in the format of restaurant "RestaurantApp.Restaurant→email". The process 500 loops back to decision block 506 to determine if other parameters are missing.

Although FIG. 5 illustrates one example of an application and action registration process 500, various changes may be made to FIG. 5. For example, while shown as a series of steps, various steps in FIG. 5 can overlap, occur in parallel, occur in a different order, or occur any number of times. As a particular example, block 514 can instead move back to decision block 506 instead of moving to block 516 such that, if the user enters new information, no dependency may be created since the user has not selected a previous application result or parameter.

Figure 6:
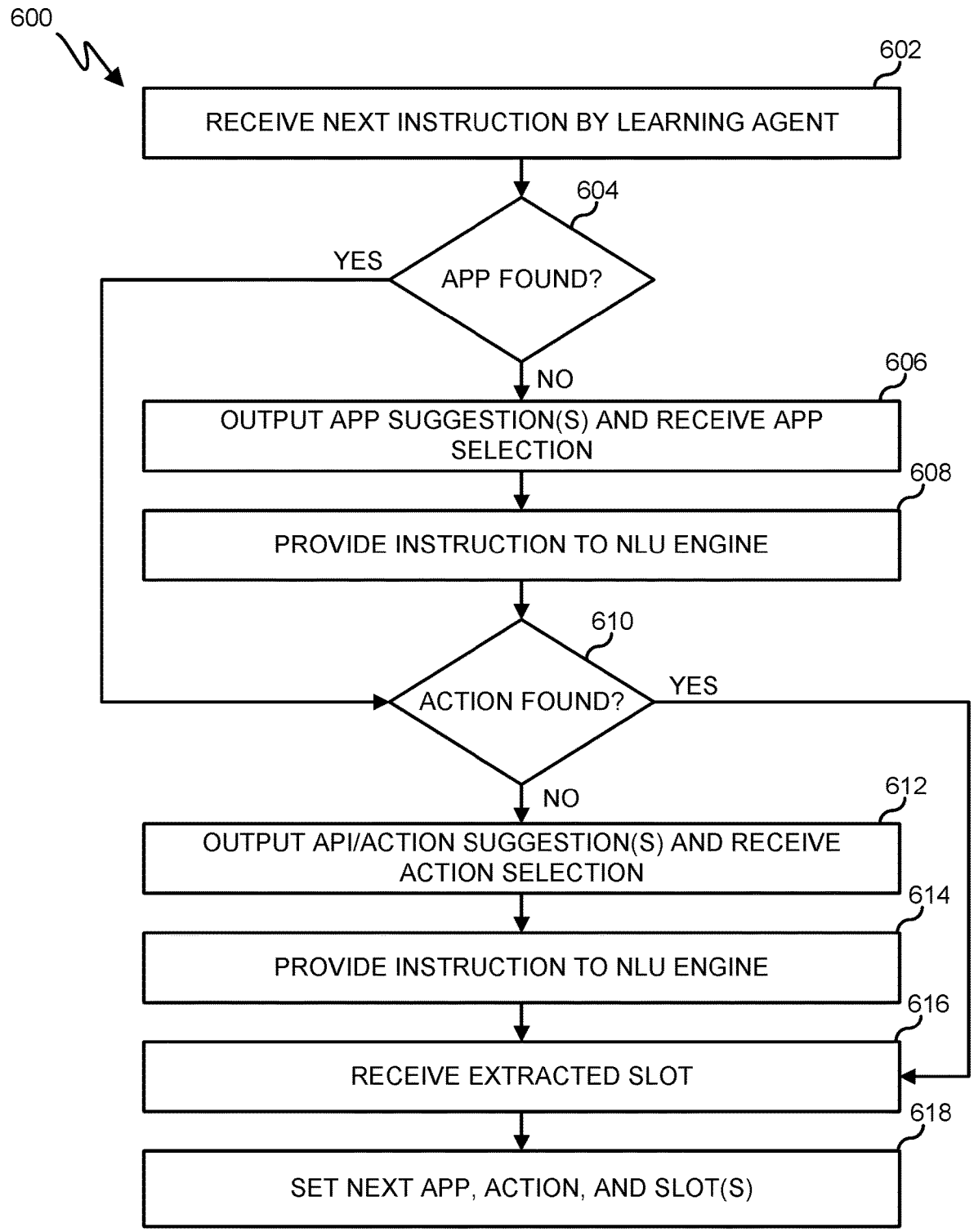
FIG. 6 illustrates an example application, action, and slot extraction process in accordance with various embodiments of this disclosure.

FIG. 6 illustrates an example application, action, and slot extraction process 600 in accordance with various embodiments of this disclosure. For ease of explanation, the process 600 may be described as being executed or otherwise used by the processor(s) 120 of any of the electronic devices 101, 102, 104 or the server 106 in FIG. 1. However, the process 600 may be used by any suitable device(s) and in any suitable system. The process 600 can be used with a complex task learning system as described with respect to the various embodiments of this disclosure, such as the system architecture 200 and/or the system 300. In some embodiments, the process 600 is part of the process of block 504 in FIG. 5.

At block 602, a processor receives a next clarifying instruction at a learning agent. When a clarifying instruction is received, the processor attempts to determine the application, action, and slot(s) to be used for the utterance of the clarifying instruction. Before receiving the next instruction at block 602 at the learning agent, the processor can already have input the next instruction into an NLU engine, such as the NLU service 208 or the NLU engine 308. After processing by the NLU engine, at decision block 604, the processor determines if the NLU engine determined the application to use for the instruction. If an application is determined with sufficient confidence, the process 600 moves to decision block 610. If an application has not been determined with sufficient confidence at decision block 604, the process 600 moves to block 606. At block 606, the processor outputs one or more application suggestions to a user, such as via the agent UI 220 or 320. In some embodiments, the application suggestions can be a ranked list of application suggestions ranked from most likely to be relevant to least likely to be relevant. The user can select one of the application suggestions or choose a different selection, such as by opening a menu that allows the user to browse all applications currently stored on the user's electronic device.

At block 608, the processor provides the instruction to the NLU engine to determine an action and possible slot(s) for the action, with the domain of the instruction now being informed by the determined or selected application from previous blocks. In some embodiments, the NLU engine used at block 608 is an application-specific NLU engine that is configured to interpret commands for the application determined or selected in the previous blocks. At decision block 610, the processor determines if an action was determined with sufficient confidence. If so, the process 600 moves to block 616. If not, the process 600 moves to block 612. At block 612, the processor outputs API and/or action suggestions to the user for selection, such as via the agent UI 220 or 320. In some embodiments, the processor can output a ranked combined list of pre-defined application skills and API calls. One of the actions or API calls in the list can be selected by the user for performing the task in the received instruction. In some embodiments, the user can also choose different actions or build an action or API call. At block 614, the processor provides the instruction to the NLU engine, which can be an application-specific NLU engine, to determine one or more parameters for the selected action.

At block 616, the processor receives one or more extracted slots for the action. The one or more extracted slots can include one or more key and value pairs that provide at least one parameter for fulfilling the action. For example, if an action determined in the process 600 is to use an email application to send an email, an extracted slot can include a key and value pair of (@contact, Alice), indicating that the email is to be sent to Alice. If any slots to fulfill the action are still not known, such as if the body or message for the email is not known, the missing parameters for the action can be determined as described with respect to FIG. 5. At block 618, the processor returns and sets the next application, action, and any determined slots to be used in fulfilling the instruction received at block 602.

Although FIG. 6 illustrates one example of an application, action, and slot extraction process 600, various changes may be made to FIG. 6. For example, while shown as a series of steps, various steps in FIG. 6 can overlap, occur in parallel, occur in a different order, or occur any number of times. Also, in embodiments in which the next instruction is not parsed before being received by the learning agent, an additional step can be included before decision block 604 to parse an NL utterance for the next instruction. Further, the process 600 can move from block 608 to block 616, such as when the processor receives an application selection and an action selection at block 606 and the processor provides the instruction to the NLU engine at block 608 to determine and receive one or more extracted slots for the selected application and action.

Figure 7:
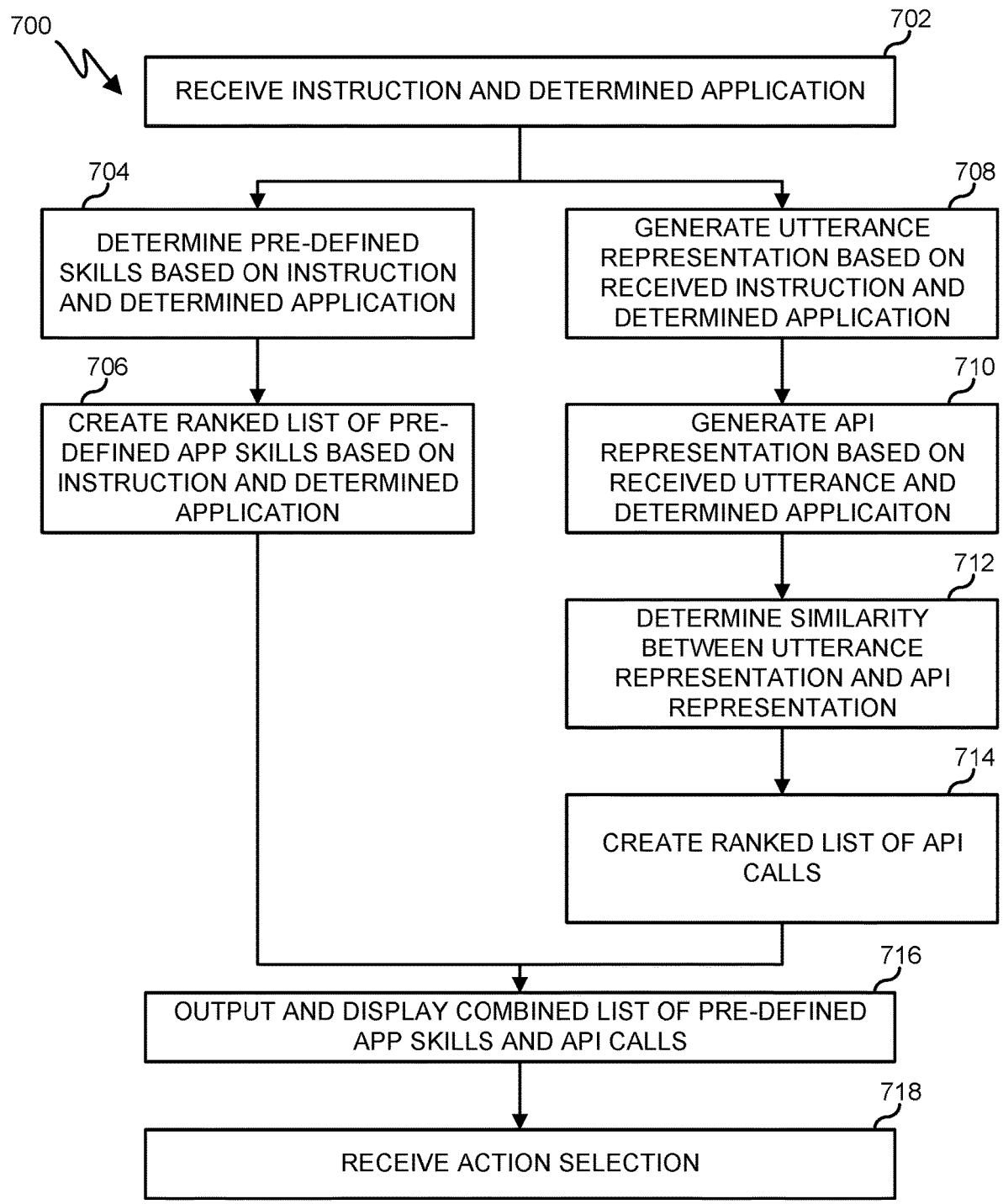
FIG. 7 illustrates an example action and application programming interface (API) suggestion process in accordance with various embodiments of this disclosure.

FIG. 7 illustrates an example action and API suggestion process 700 in accordance with various embodiments of this disclosure. For ease of explanation, the process 700 may be described as being executed or otherwise used by the processor(s) 120 of any of the electronic devices 101, 102, 104 or the server 106 in FIG. 1. However, the process 700 may be used by any suitable device(s) and in any suitable system. The process 700 can be used with a complex task learning system as described with respect to the various embodiments of this disclosure, such as the system architecture 200 and/or the system 300. In some embodiments, the process 700 can be part of the process 600, such as block 612, in FIG. 6.

At block 702, the processor receives an instruction and a determined application. In some embodiments, if an action cannot be determined by an NLU engine even with the determined application, the processor can create a ranked list of application actions and/or API calls for the user to choose from to perform the intended action. At block 704, the processor determines a set of pre-defined skills for the determined application. The pre-defined skills can be included in the set of pre-built skills 222. An application developer can develop and add new skills corresponding to the application developer's application to be used by the PA service 212 using standard skill development tools, such as an IDE. In some embodiments, pre-built skills can return action results in a standardized format, such as JavaScript Object Notation (JSON) format. In some embodiments, the NLU engine, such as the NLU service 208 or NLU engine 308, can determine which skills to include in the set of pre-defined skills to suggest to the user based on confidence scores for the utterance. For example, the processor could choose to include or exclude certain pre-built skills from the set if the NLU engine is not confident that an action would correspond to that skill type. In other embodiments, the processor can retrieve all pre-built skills for an application. At block 706, the processor creates a ranked list from the retrieved pre-built skills performable by the application, such as by ranking the skills from most relevant or likely to be the intended action to least relevant or likely to be the intended action. In some embodiments, creating the ranked list of skills can be based on NLU model confidence scores for the action or can be based on other criteria, such as which skills are most often chosen by users.

The process 700 also includes determining a set of API calls, such as from the API and actions knowledge base 224 or 324. The API and actions knowledge base can include application or device APIs added by developers that are in a user-friendly and standardized format. This allows users to teach or perform actions beyond pre-built application skills. Application developers can register their APIs in the API and actions knowledge base 224 or 324, such as via an API knowledge base's web service or a standalone IDE. The application developers can also implement a wrapper function according to a standardized format of the API and actions knowledge base 224 or 324 to enable users to execute the APIs via the PA. For both pre-built skills and API calls, the PA service 212 can monitor and control application actions in the same fashion as other actions, such as actions executed after parsing an NL instruction. Since these actions are invoked by voice commands or a PA service UI-based input, the PA can execute the corresponding program implemented as part of a pre-built skills action, the wrapper function from the API knowledge base, or both. Due to JSON input/output standardization and the learning of application or action dependencies, the returned results from one action or application can be routed to another action or application without any elaborate data transformation. The processor can perform API retrieval from the user's NL instruction using API meta-information, such as category name, action name, API description, uniform resource identifier (URI) or uniform resource locator (URL), parameters, output format, fulfillment function, or other meta-information.

At block 708, the processor generates an utterance representation based on the received instruction and the determined application. For example, the utterance representation can include the name of the determined application and the uttered action. In some embodiments, the utterance representation can be a vector of a certain dimension which represents the semantics of the utterance or action. At block 710, the processor generates an API representation based on the received utterance and the determined application. For example, the API representation can be formatted like an API call for the application, with the representation including an invocation of the application and with the action and parameters replaced with information from the utterance. In some embodiments, the API representation can be a vector of a certain dimension which represents the semantics of the API action. At block 712, the processor determines the similarity between the utterance representation and the API representation to determine formats for API calls that may be relevant to the user's intended action. In some embodiments, the similarity between the utterance representation and the API representation can be computed by measuring a suitable distance, such as a cosine distance, between the utterance representation vector and the API representation vector. At block 714, the processor creates a ranked list of API calls based on the determined similarity from block 712.

At block 716, the processor outputs and displays to the users a combined list of ranked pre-defined application skills and API calls, such as in the agent UI 220 or 320. The user can select an action or API call that will perform the task the user intended in the clarifying utterance. At block 718, the processor receives the selected action or API call to be used for the action. The processor can determine appropriate parameters for performing the action, such as is described in FIG. 6, and can determine any missing parameters, such as is described in FIG. 5. When creating a complex task object after each clarifying instruction is processed, the complex task object will include any action or API call to use as defined in the process 700 so that future tasks using the complex task object will also use the selected actions or API calls.

Although FIG. 7 illustrates one example of an action and API suggestion process 700, various changes may be made to FIG. 7. For example, while shown as a series of steps, various steps in FIG. 7 can overlap, occur in parallel, occur in a different order, or occur any number of times. Also, the processor may not output a combined list of pre-defined skills and API calls and can instead output separate lists of pre-defined skills and API calls. Further, the user may choose to only view pre-defined skills or only view API calls.

FIG. 8 illustrates an example set of API meta-information 800 in accordance with various embodiments of this disclosure. The meta-information 800 can be stored in the API and actions knowledge base 224 or 324 to provide a standardized set of meta-information used in creating API calls and retrieving data for suggesting API calls to users. The API and actions knowledge base 224 or 324 can include application or device APIs added by developers that are in a user-friendly and standardized format. This allows users to teach or perform actions beyond pre-built application skills. Application developers can register their APIs in the API and actions knowledge base, and the application developers can implement a wrapper function according to a standardized format of the API and actions knowledge base. For both pre-built skills and API calls, the PA service 212 can monitor and control application actions in the same fashion as other actions, such as actions executed after parsing an NL instruction.

As shown in FIG. 8, the meta-information 800 can include various attributes each having an attribute description and a value for the attribute. For example, as shown in FIG. 8, attributes can include a category, an action, a description, a URI, parameters, a response, and a fulfillment attribute. The meta-information 800 can include a description of each attribute and a value for the attribute. For instance, the example in FIG. 8 shows that the description for the category attribute is "name of API category" and has an example category of "Messages." The description for the action attribute is "action performed by API in category" and has an example action of "Send." The description for the description attribute is "API description" and has an example description of "sends the specified message to the recipients in the To, Cc, and Bcc headers." The description for the URI attribute is "API call URI" and has an example URI of "https://www.googleapis.com/upload/gmail/v1/users/userid/messages/send."

The description for the parameters attribute is "API call parameters" and has example parameters of "userid, uploadtype, raw message . . . " that indicates the parameters to be used for the API call of sending a message in a message API category. The description for the response attribute is "response object template" and has an example object of "message resource object," indicating a message resource object is provided by the response to this API call. The description for the fulfillment attribute is "wrapper function for API call" and has an example fulfillment wrapper function of "sendMessage( )" indicating the function of the API that sends the message, including all the additional information to fulfill the sending of the message such as the parameters.

Although FIG. 8 illustrates one example of a set of API meta-information 800, various changes may be made to FIG. 8. For example, the meta-information can include any other or additional attributes, descriptions, and values. Also, it will be understood that the specific values shown in FIG. 8 are examples only and that other values can be used for each category, depending on the application and API functions for the application.

Figure 9:
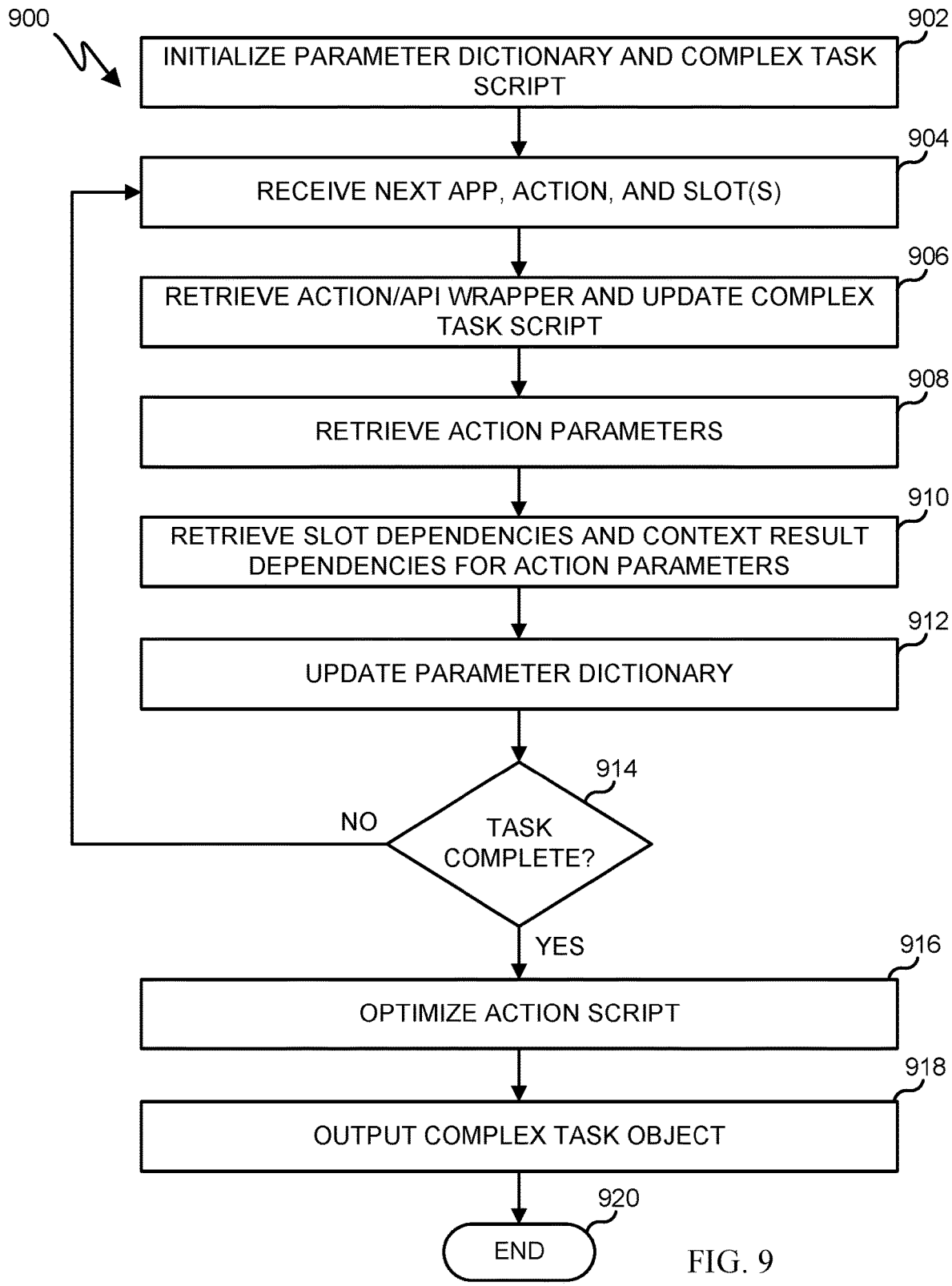
FIG. 9 illustrates an example complex task generation process in accordance with various embodiments of this disclosure.

FIG. 9 illustrates an example complex task generation process 900 in accordance with various embodiments of this disclosure. For ease of explanation, the process 900 may be described as being executed or otherwise used by the processor(s) 120 of any of the electronic devices 101, 102, 104 or the server 106 in FIG. 1. However, the process 900 may be used by any suitable device(s) and in any suitable system. The process 900 can be used with a complex task learning system as described with respect to the various embodiments of this disclosure, such as the system architecture 200 and/or the system 300. In some embodiments, the process 900 can be part of block 316 or block 418 to generate a complex task object.

At block 902, a processor initializes a parameter dictionary and a complex task script. At block 904, the processor receives the next application, action, and slot(s) for one of the clarifying instructions provided by a user as determined by the processor and learning agent. For example, if the clarifying instruction was to send an email regarding a restaurant to a contact using an email application, the application, action, and slot(s) retrieved at block 904 could include an identifier for an email application, a send email action in the form of a pre-built action or an API call, and a @person slot type. At block 906, the processor retrieves an action/API call wrapper script for the action retrieved at block 904, such as from the API and actions knowledge base. The processor also appends the wrapper script to the complex task script or updates the complex task script to include the wrapper. For example, if the clarifying instruction was to send an email regarding a restaurant to a contact using an email application, the retrieved action or API call could be an API call formatted as "EmailApp.sendEmail( )" This action is appended to the complex task script to use in building an executable complex task object.

At block 908, the processor retrieves the action or API call parameters previously determined during teaching of the instruction. For example, if the clarifying instruction was to send an email regarding a restaurant to a contact using an email application, the fetched action parameters can include and be formatted as "{EmailApp.email.body, EmailApp.email.recipient}." At block 910, the processor retrieves any slot dependencies or context result dependencies for the action or API call parameters retrieved at block 908. For example, if the clarifying instruction was to send an email regarding a restaurant to a contact using an email application, a retrieved slot dependency could include "@person-→EmailApp," indicating that the retrieved @person parameter has a dependency on the email application. As another example, a retrieved context result dependency could be "RestaurantApp.Restaurant→EmailApp," indicating that restaurant information obtained from a restaurant search application is to be used with fulfilling an action using the email application. At block 912, the processor updates the parameter dictionary to include the retrieved parameters and associated dependencies using the current action or API call parameters as keys and the corresponding slot keys or context results as values to represent the dependencies. For example, if the clarifying instruction was to send an email regarding a restaurant to a contact using an email application, the parameter dictionary can be updated to include information such as "{EmailApp.email.body=RestaurantApp.Restaurant, EmailApp.email.recipient=@person}," indicating that the email to be sent is to include restaurant information retrieved from a restaurant search application in the body of the email and that the email is to be sent to a term in an utterance that is associated with an @person slot.

At decision block 914, the processor determines if the complex task is complete, such as if each clarifying instruction has been processed at blocks 904-912. If not, the process 900 moves back to block 904 to retrieve the next application, action, and slot(s). If the processor determines the complex task is complete at decision block 914, the process 900 moves to block 916. At block 916, the processor optimizes the complex task script by combining the applications, actions, and parameters retrieved at block 904 along with the associated dependencies stored in the parameter dictionary. The processor can also convert the combined information into a complex task object, such as an executable program, that can be later invoked to perform the now-learned complex task. At block 918, the processor outputs the complex task object that can include a complex task program and a parameter dictionary. The complex task object can be stored in association with the user so that the user can later use the same complex task. In some embodiments, the complex task object can be stored on a server, such as the host device 202, or on the user's electronic device, such as the electronic device 204. The process 900 ends at block 920.

Although FIG. 9 illustrates one example of a complex task generation process 900, various changes may be made to FIG. 9. For example, while shown as a series of steps, various steps in FIG. 9 can overlap, occur in parallel, occur in a different order, or occur any number of times. Also, the process 900 can include a step of executing each received action of the complex task being created, such as after block 912, so that, upon first creation of the new complex task, each retrieved action is executed and a complex task object is later created for future execution of the complex task.

Figure 10A:
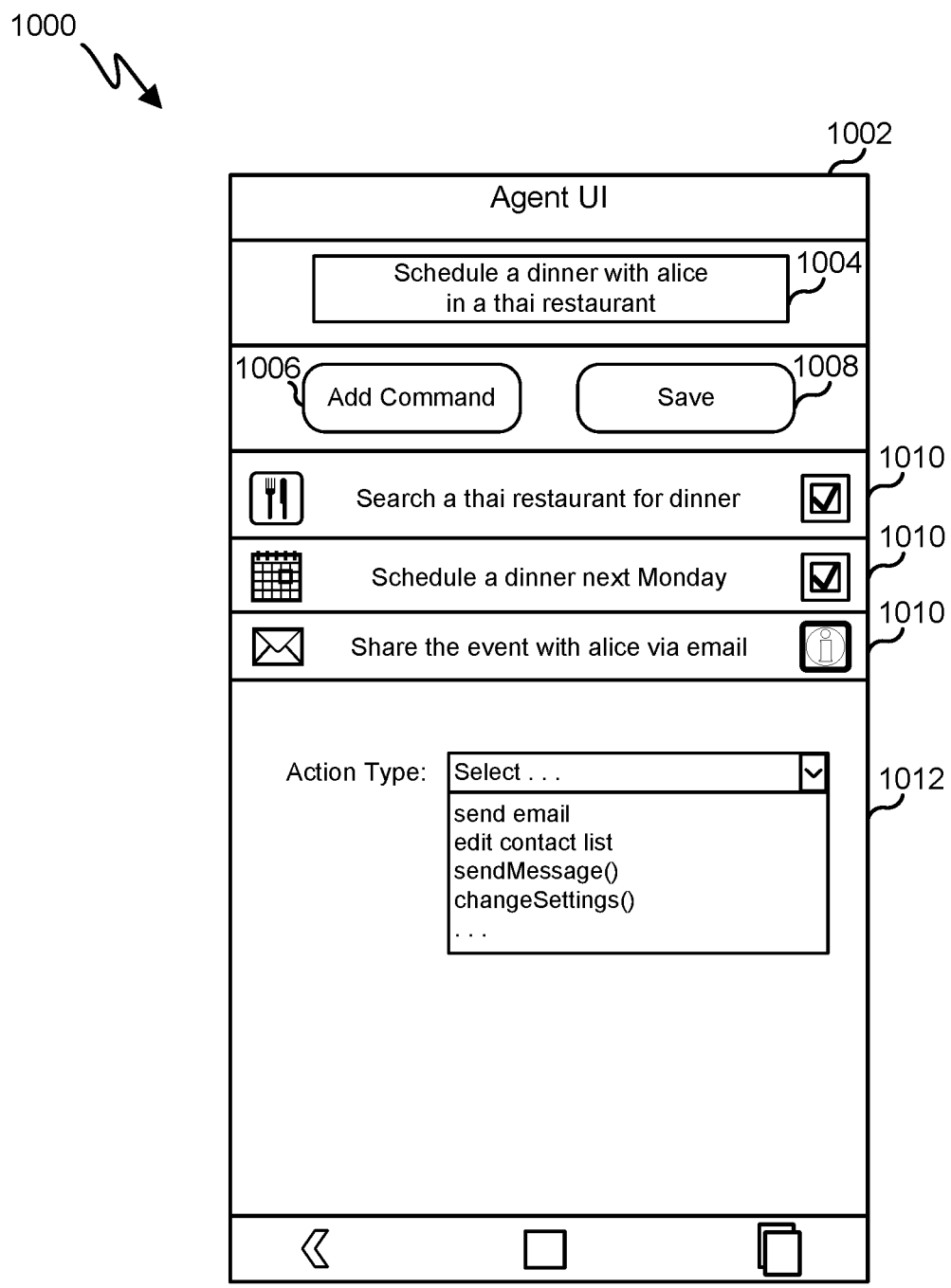
FIGS. 10A and 10B illustrate examples of an agent user interface in accordance with various embodiments of this disclosure.
Figure 10B:
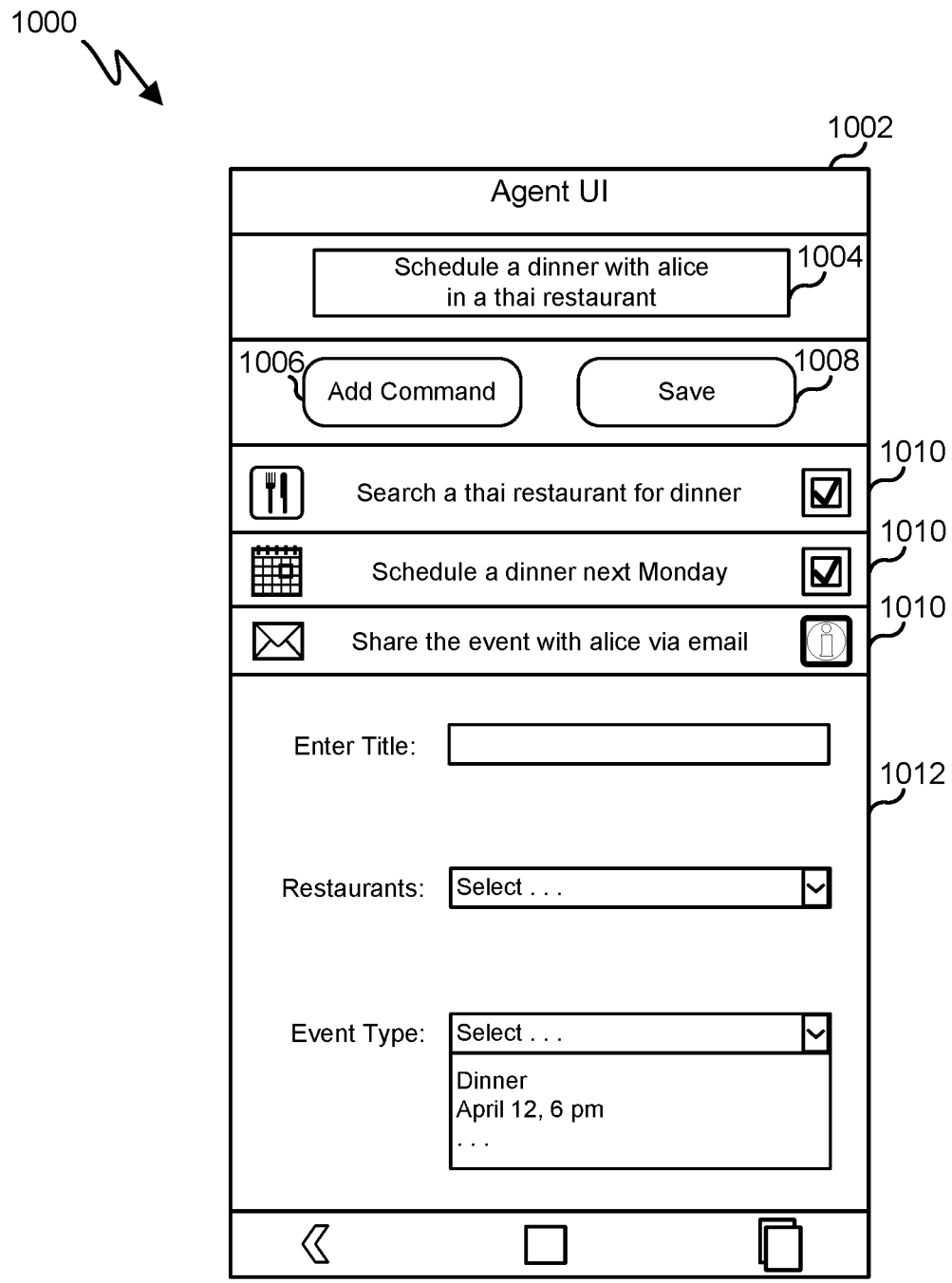

FIGS. 10A and 10B illustrate examples of an agent UI 1000 in accordance with various embodiments of this disclosure. FIG. 10A illustrates the agent UI 1000 in an action suggestion display mode, and FIG. 10B illustrates the agent UI 1000 in a parameter selection mode. The agent UI 1000 includes a UI window 1002 in which various information concerning the teaching process can be displayed to the user to interact with the learning agent. For example, the UI window 1002 can include an utterance display area 1004 that displays a complex task utterance received from a user that is currently being taught to the learning agent via the agent UI 1000. In some embodiments, upon receiving an utterance by the PA service that includes an unknown complex task, the learning agent can invoke the agent UI 1000 on the user's electronic device. In other embodiments, the user can choose to open the agent UI 1000 to begin teaching a new complex task to the learning agent.

The UI window 1002 also includes an add command button 1006 that can be selected to begin adding a new action for the complex task. Upon selecting the add command button 1006, the agent UI 1000 can prompt the user to provide a new clarifying instruction, such as via an utterance or by inputting a command into the agent UI 1000. When the complex task is complete, a save button 1008 can be selected to save the complex action, such as in the manner described with respect to FIG. 9. In some embodiments, the save button 1008 can be used to save each separate clarifying instruction action when the user has selected the appropriate options in the agent UI for the clarifying instruction. As each new command for the complex task is added, separate action areas 1010 for each clarifying instruction can be displayed in the UI window 1002. For example, if the original utterance of "schedule a dinner with alice in a thai restaurant" is being taught to the learning agent, the user can provide the clarifying instructions of "search a thai restaurant for dinner," "schedule a dinner next Monday," and "share the event with alice via email," with each clarifying instruction being displayed in a separate action area 1010.

An icon in each action area 1010 can indicate whether the clarifying instruction for that particular action area 1010 has been completed. For example, as shown in FIGS. 10A and 10B, the action areas 1010 for the first two clarifying instructions each have a check mark icon to indicate that those two clarifying instructions have been taught and completed. The action area 1010 for the third clarifying instruction includes an "i" icon, indicating that this clarifying instruction is still to be taught or is currently being taught to the learning agent. Each of the action areas 1010 can also include an icon indicating the learned application for the clarifying instruction. For example, as shown in FIGS. 10A and 10B, the action area 1010 for the first clarifying instruction shows a dining application icon, the action area 1010 for the second clarifying instruction shows a calendar application icon, and the action area 1010 for the third clarifying instruction shows an email application icon. If an application is still to be learned for a clarifying instruction, the agent UI 1000 may not display an icon in an action area 1010. In FIG. 10A, a teaching area 1012 is displaying options for selecting an action type for the third clarifying instruction. Thus, the application for the third clarifying instruction has already been determined, and the email icon has been added to the action area 1010 for the third clarifying instruction. If the application had not already been determined, the area where the email icon is displayed in FIG. 10A may appear blank.

As shown in FIGS. 10A and 10B, the teaching area 1012 of the agent UI 1000 can provide various information and items that are selectable for the user. For example, in FIG. 10A, the teaching area 1012 displays a list of selectable action types. These selectable action types can be in a ranked list of combined pre-built skills and API calls that the learning agent retrieves and presents to the user in the teaching area 1012, such as in the manner described above with respect to FIGS. 6, 7, and 8. The teaching area 1012 can similarly display application suggestions, such as when an application cannot be determined from parsing a clarifying instruction utterance by the NLU engine. As another example, as shown in FIG. 10B, the teaching area 1012 can show options for setting parameters and dependencies for actions. For instance, as shown in FIG. 10B, the teaching area 1012 displays a title text input box for naming the particular action, a restaurants selection UI object for selecting a restaurant option found when performing the action for the first clarifying instruction, and an event type selection UI object for selecting an event type for the calendar event to share with Alice via email. FIG. 10B thus illustrates that previous actions in the complex task being taught to the learning agent can provide information across applications such that, in this example, restaurant information from one application can be used when sharing a dinner event via another application. As also described with respect to FIGS. 4, 5, and 6, the inter-application dependencies taught to the learning agent via the agent UI 1000 can be registered with the learning agent so that the inter-application dependencies can be retained when the user again performs the complex task taught to the learning agent.

Although FIGS. 10A and 10B illustrate examples of an agent UI 1000, various changes may be made to FIGS. 10A and 10B. For instance, it will be understood that the specific user interfaces illustrated in FIGS. 10A and 10B are examples only and that the appearance, structure, arrangement, size, and other attributes of the agent UI 1000 can be different. As a particular example, the agent UI 1000 can be of a different arrangement, dimension, or size based on the type of electronic device on which the agent UI 1000 is being displayed. Also, the various sections of the agent UI can also be rearranged, such as when the teaching area 1012 and the action areas 1010 are located in different areas of the agent UI 1000. Further, it will also be understood that the agent UI 1000 can display any number of action areas 1010 depending on the number of clarifying instructions submitted for the complex task. In addition, the agent UI 1000 can include different display screens, such as a display screen that shows a list of all complex actions that have been previously created by the user.

Figure 11:
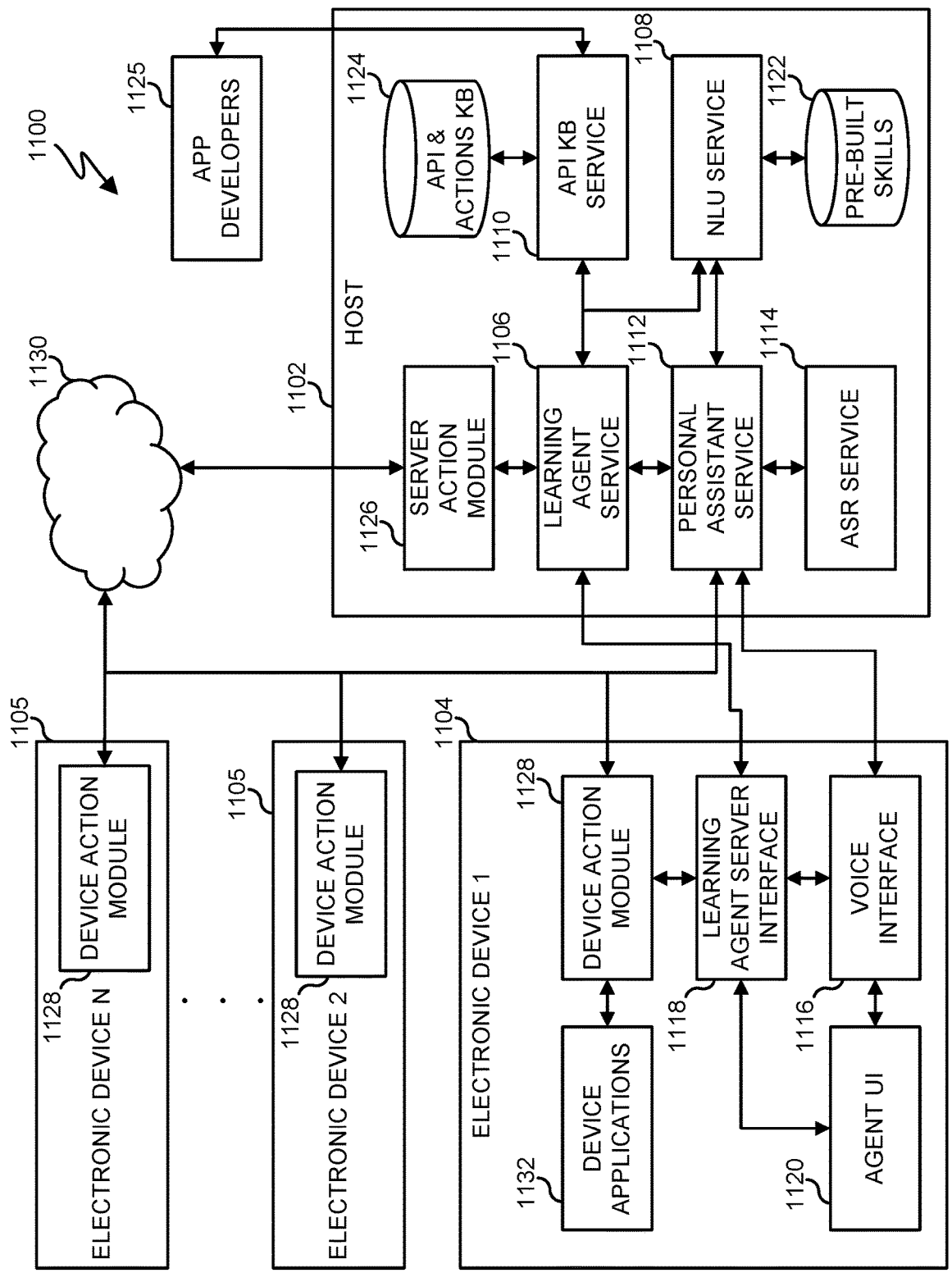
FIG. 11 illustrates an example multi-device complex task learning system architecture in accordance with various embodiments of this disclosure.

FIG. 11 illustrates an example multi-device complex task learning system architecture 1100 in accordance with various embodiments of this disclosure. The architecture 1100 includes at least one host device 1102, a first electronic device 1104, and one or more additional electronic devices 1105. In some embodiments, the host device 1102 can be the server 106, and the electronic device 1104 can be the electronic device 101. Each additional electronic device 1105 may have similar components as the electronic device 1104 and/or the electronic device 101. The host device 1102 includes a learning agent service 1106 that utilizes an NLU service 1108 and an API KB service 1110 to learn to perform complex tasks provided in NLU commands from a PA service 1112 executed by the host device 1102. The PA service 1112 cooperates with an ASR service 1114 to receive queries or utterances from the electronic device 1104. In various embodiments of this disclosure, the NLU service 1108 can include a probabilistic NLU model, such as a neural network, that is used to determine the intent of NL utterances, such as the domain, applications intended to be used, and actions to be performed, and fills slot or parameter values for the utterances.

The electronic device 1104 includes a speech/voice interface 1116 configured to receive queries or utterances from a user of the electronic device 1104 that are transmitted to the host device 1102 at the PA service 1112. The utterances can include commands to use one or more other devices to perform a complex task, such as at least one additional electronic device 1105. The PA service 1112 can use the NLU service 1108 to parse NL utterances received by the PA service 1112, and the PA service 1112 can cause various tasks to be performed. If an utterance received from the electronic device 1104 by the PA service 1112 cannot be understood or effectively parsed by the NLU service 1108 or if the utterance is otherwise unknown to the host device 1102, the learning agent service 1106 can be used to teach the complex task in the utterance to the host device 1102. A learning agent server interface 1118 on the electronic device 1104 can communicate with the learning agent service 1106 to provide information to the learning agent service 1106, informing the learning agent service 1106 of how to complete a new complex task.

As an example of this functionality, in various embodiments of this disclosure, an agent UI 1120 can be displayed on the electronic device 1104 that allows a user of the electronic device 1104 to provide clarifying instructions to the learning agent service 1106 that teach the learning agent service 1106 how to complete an unrecognized multi-device complex task included in an utterance received from the electronic device 1104 by the PA service 1112 of the host device 1102. When a multi-device complex task in an utterance received by the PA service 1112 is unrecognized, the learning agent service 1106 can transmit a command to the learning agent server interface 1118 to display a prompt in the agent UI 1120, asking the user to provide additional information regarding the complex task. The user can provide clarifying instructions in various formats. For example, suppose a user wants to accomplish the complex task of cooking brisket using three different devices and/or applications by uttering "I want to cook brisket in the oven." Upon a failure to understand the intent/task corresponding to this command, the PA service 1112 and the learning agent service 1106 prompt the user via the agent UI 1120 to teach this task to the PA service 1112 and the learning agent service 1106. In some embodiments, the user can initiate the teaching of a new task by opening the agent UI 1120 and providing commands, such as NL commands or utterances, to teach the task.

When teaching the PA service 1112 and the learning agent service 1106 how to perform a complex task, the user can provide one or more additional utterances that each provide one step in the multi-device complex task to be performed so that the PA service 1112 and the learning agent service 1106 can cause each individual task for each of the additional clarifying utterances to be performed. A new complex task that performs each individual task can be built and stored by the PA service 1112 and the learning agent service 1106. To build the new multi-device complex action, the learning agent service 1106 can use the NLU service 1108 to parse each clarifying instruction and determine which device and device application to use for the clarifying instruction, which action to perform based on the determined device and application, and the parameter(s), such as the slot(s), for the action. In some embodiments, the NLU service 1108 can determine the action from a set of pre-built skills 1122. Each pre-built skill can be associated with a specific application and can be defined and provided by a developer of the specific application, such as by providing pre-built skills using PA skill development tools available to the developers that ensure the pre-built skills are compatible with the PA service 1112 and recognizable by the NLU service 1108.

In some embodiments, to determine the action for a clarifying instruction, the learning agent service 1106 can use the API knowledge base service 1110 to access an API and actions knowledge base 1124 that includes various API calls for specific applications, which can be used to build new skills for clarifying instructions. Application developers 1125 can register their APIs in the API and actions knowledge base 1124, such as via an API knowledge base's web service or a standalone IDE. Each application developer 1125 can also implement a wrapper function according to a standardized format of the API and actions knowledge base 1124.

As each clarifying instruction is processed, the host device 1102 can cause each individual task to be performed by a server action module 1126. The server action module 1126 of the host device 1102 communicates with a device action module 1128 of each of the electronic devices 1104 and 1105 over a network or cloud 1130. It will be understood that other components can also communicate over a network in a similar manner, such as the components 1106, 1112, 1116, and 1118. The server action module 1126 transmits a command to the device action module 1128 of the appropriate electronic device 1104 or 1105 to perform an action. The device action module 1128 instructs performance of the action on the particular electronic device that is to perform the action.

As an example of this functionality, consider that the clarifying instructions for an original utterance of "I want to cook brisket in the oven" include a first instruction of "search recipe for brisket," a second instruction of "pre-heat my oven," and a third instruction of "search for videos on how to cook brisket." The learning agent service 1106 can process each clarifying instruction. For example, for the first instruction, the learning agent service 1106 can learn the action to perform is to search a recipe application on the user's smartphone for a brisket recipe. For the second instruction, the learning agent service 1106 can learn the action to perform is to pre-heat a smart oven device based on a temperature listed in the recipe information returned for the first instruction. For the third instruction, the learning agent service 1106 can learn the action to perform is to search for instructional videos on cooking brisket on a video streaming application of a smart television device. In some embodiments, the learning agent service 1106 can also use devices currently in a synced devices list in one of the user's electronic devices to find appropriate devices to use. Also, in some embodiments, a user can input devices to use when prompted.

When each action for each clarifying instruction provided by the user is determined, a multi-device complex task object that includes commands for executing the individual tasks on specific devices for the multi-device complex task can be created. The complex task object is stored by the host device 1102. When the PA service 1112 receives a subsequent utterance that is the same as or similar to the stored complex task, the PA service 1112 can cause the complex task to be performed without further input from the user. In some embodiments, to provide clarifying instructions, the user can select a clarifying instruction from a list displayed in the agent UI 1120 of possible clarifying instructions. Also, in some embodiments, the user can provide clarifying instructions by inputting a command, such as a sentence similar to an utterance, into a text input area of the agent UI 1120.

Although FIG. 11 illustrates one example of a multi-device complex task learning system architecture 1100, various changes may be made to FIG. 11. For example, in the multi-device complex task learning system architecture 1100, the PA service 1112 may include one or more of the server action module 1126, learning agent service 1106, ASR service 1114, or NLU service 1108 as part of the functionality of the PA service 1112. Also, the functionality of the voice interface 1116, learning agent server interface 1118, agent UI 1120, and device action module 1128 can be included within a single entity. Further, the API and actions knowledge base 1124 and the set of pre-built skills 1122 can be included within separate data stores or databases, or in the same data store or database.

Figure 12:
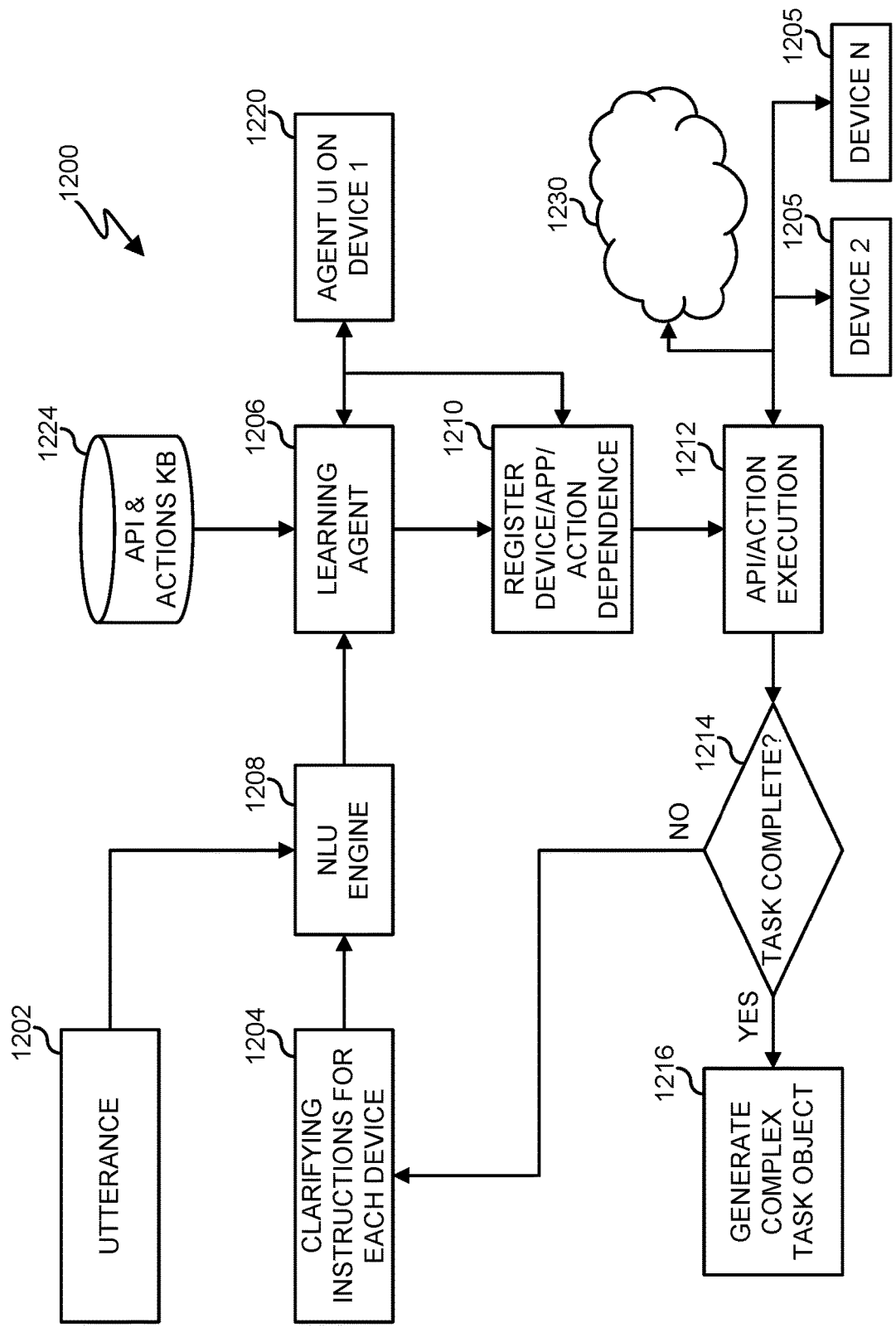
FIG. 12 illustrates an example multi-device complex task learning agent system in accordance with various embodiments of this disclosure.

FIG. 12 illustrates a multi-device complex task learning agent system 1200 in accordance with various embodiments of this disclosure. The system 1200 includes a learning agent 1206 configured to learn complex tasks. In some embodiments, the learning agent 1206 can be the learning agent service 1106 of FIG. 11. An utterance 1202, such as an utterance received by a PA service such as the PA service 1112, includes an instruction to perform a multi-device complex task and is received by an NLU engine 1208. If the multi-device complex task included in the utterance 1202 is not known to, or is deemed to be undeterminable by, the NLU engine 1208, the learning agent 1206 can prompt a user for clarifying instructions, such as via an agent UI 1220 on a first electronic device. In response to the prompt, the user can provide a clarifying instruction 1204 to the NLU engine 1208 that provides a step for performing the complex task.

As an example of this functionality, if the utterance 1202 includes the utterance "I want to cook brisket in the oven," the user can be informed via the agent UI 1220 that the complex task is unknown and prompted to provide one or more clarifying instructions. For instance, to teach the learning agent 1206 how to help with cooking brisket in the oven, the user can provide three clarifying instructions 1204 of "search recipe for brisket," "pre-heat my oven," and "search for videos on how to cook brisket." In some embodiments, the user can provide one clarifying instruction 1204 at a time, where the learning agent 1206 processes each clarifying instruction 1204 and prompts the user for a next clarifying instruction 1204. In other embodiments, the user can provide all clarifying instructions 1204 in response to a single prompt, with the learning agent 1206 processing each one in turn or simultaneously until the complex task is created. Also, in some embodiments, to further assist the learning agent 1206 to perform a task associated with each clarifying instruction 1204, the user can include in one or more of the clarifying instructions the name of the device and/or application to use for the action. If a user does not provide the name of the device and/or application, the NLU engine 1208 can attempt to determine the device or application to be used based on the utterance of the clarifying instruction 1204. The complex task can be created using the clarifying instructions 1204 by determining the devices and applications to use based on each clarifying instruction and performing each subtask, action, or API call for each clarifying instruction. It will be understood that, depending on the specific clarifying instructions 1204 provided, multiple actions may be performed by the same device or the same application.

The system 1200 further includes a register app/action dependence module 1210 that processes each clarifying instruction 1204 to understand the application, action, and parameter(s) for the clarifying instruction 1204 and registers any dependencies for the action in the complex task, such as by registering that a second action and/or a second device for a second received clarifying instruction is dependent on a first action and/or a first device for a first received clarifying instruction. The register app/action dependence module 1210 can also receive additional input via the agent UI 1220 on the first device to provide selections for different devices, applications, actions, parameters, or dependencies for actions. The register app/action dependence module 1210 can perform functions similar to those described with respect to FIGS. 5, 6, and 7 while also providing for determination and registration of dependencies for devices and/or device applications. After the register app/action dependence module 1210 determines the device, application, action, parameters, and dependencies for a clarifying instruction 1204, an API/action execution module 1212 performs the action for the clarifying instruction, such as by transmitting a command to perform the determined action over a network 1230 to an additional electronic device 1205. For example, the network 1230 can be the network 1130, and the API/action execution module 1212 can be performed by the server action module 1226 to transmit a command to perform the action from the host device 1102 over the network 1230 to a device action module 1228 of the electronic device 1104 or an additional electronic device 1105 or 1205 for performance by a device application on the specific device.

As an example of this functionality, consider that the clarifying instructions for an original utterance of "I want to cook brisket in the oven" include a first instruction of "search recipe for brisket," a second instruction of "pre-heat my oven," and a third instruction of "search for videos on how to cook brisket." The learning agent 1206 can process each of these clarifying instructions to learn each device action. For example, for the first instruction, the learning agent service 1106 can learn the action to perform is to search a recipe application on the user's smartphone for a brisket recipe. For the second instruction, the learning agent 1206 can learn the action to perform is to pre-heat a smart oven device based on a temperature listed in the recipe information returned for the first instruction, while registering the dependency of the oven device and application on the temperature information obtained from the first instruction action. For the third instruction, the learning agent 1206 can learn the action to perform is to search for instructional videos on cooking brisket on a video streaming application of a smart television device. In some embodiments, the learning agent 1206 can also use devices currently in a synced devices list in one of the user's electronic devices to find appropriate devices to use. Also, in some embodiments, a user can input devices to use when prompted.

After execution of the action for the clarifying instruction 1204, at decision block 1214, the learning agent 1206, such as via a processor 120 of the host device 1102, determines whether the complex task is complete. If not, a next clarifying instruction 1204 is processed by the NLU engine 1208 and the learning agent 1206 to determine a device, application, and/or action to perform the next clarifying instruction 1204. Each clarifying instruction is handled in this manner until the learning agent 1206 determines that the complex task is complete at decision block 1214. If so, at block 1216, a complex task object is generated that provides a recipe or set of instructions, scripts, or programs that can be executed to perform the new complex task in the future across the learned devices, such as is described above with respect to FIG. 9. The new complex task object can be stored in an action database hosted by a server, such as the host device 1102, and/or a user's electronic device, such as electronic device 1104 or additional electronic device 1105 or 1205.

Although FIG. 12 illustrates one example of a multi-device complex task learning agent system 1200, various changes may be made to FIG. 12. For example, decision block 1214 may not be performed in the system 1200, such as when all clarifying instructions 1204 are processed simultaneously. Also, the API/action execution module 1212 may not perform each action of each clarifying instruction 1204 until each action for each clarifying instruction 1204 is determined by the learning agent 1206 and the register app/action dependence module 1210. Further, the API and actions knowledge base 1224 can also include pre-built skills for applications, such as the set of pre-built skills 1122.

Although this disclosure has been described with example embodiments, various changes and modifications may be suggested to one skilled in the art. It is intended that this disclosure encompass such changes and modifications as fall within the scope of the appended claims.

What is claimed is:

1. A method for complex task machine learning, the method comprising:
receiving an unrecognizable command for performing a complex task, wherein the unrecognizable command cannot be understood or effectively parsed, and wherein the complex task requires use of multiple applications to be completed;

generating a prompt to provide one or more instructions regarding the unrecognizable command;

receiving the one or more instructions in response to the prompt, wherein each of the one or more instructions provides information on performing a respective portion of the complex task;

determining at least two actions each respective to and based on one of the one or more instructions provided, wherein each action is capable of performing its respective portion of the complex task, and wherein at least some of the actions are associated with different ones of the multiple applications;

creating, by at least one processor, a complex action for performing the complex task based on the actions for the one or more instructions and the multiple applications;

generating, by the at least one processor, a complex task object including commands for completing the complex action, wherein the complex task object provides an order for performing the actions and identifies the multiple applications; and storing, by the at least one processor, the complex task object in a knowledge base to enable a subsequent performance of the complex action.

2. The method of claim 1, wherein determining the at least two actions each respective to and based on one of the one or more instructions includes identifying, based on at least one of the one or more instructions, an application context or a context-specific action in the knowledge base.

3. The method of claim 1, wherein determining the at least two actions each respective to and based on one of the one or more instructions includes:
identifying, based on at least one of the one or more instructions, that an application context or a context-specific action is not provided in the knowledge base;
generating a request for information on the application context or the context-specific action; and
receiving the information on the application context or the context-specific action in response to the request.

4. The method of claim 3, wherein the request for information on the application context or the context-specific action is displayed in a user interface that provides one or more selectable items for indicating the application context or the context-specific action.

5. The method of claim 1, wherein creating the complex action includes registering at least one action for at least one of the one or more instructions as being dependent on at least one action for another one of the one or more instructions.

6. The method of claim 1, further comprising:
instructing performance, by a first device, of at least one action of a first one of the one or more instructions; and
instructing performance, by a second device, of at least one action of a second one of the one or more instructions.

7. The method of claim 1, further comprising:
storing, in the complex task object, the complex action for performing the complex task in association with one or more parameters corresponding to the unrecognizable command; and
executing the complex action in response to receiving a subsequent command, wherein the subsequent command includes one or more features in common with the unrecognizable command.

8. An electronic device for complex task machine learning, the electronic device comprising:
at least one memory; and
at least one processor coupled to the at least one memory, wherein the at least one processor is configured to:
receive an unrecognizable command for performing a complex task, wherein the unrecognizable command cannot be understood or effectively parsed, and wherein the complex task requires use of multiple applications to be completed;
generate a prompt to provide one or more instructions regarding the unrecognizable command;
receive the one or more instructions in response to the prompt, wherein each of the one or more instructions provides information on performing a respective portion of the complex task;
determine at least two actions each respective to and based on one of the one or more instructions provided, wherein each action is capable of performing its respective portion of the complex task, and wherein at least some of the actions are associated with different ones of the multiple applications;
create a complex action for performing the complex task based on the actions for the one or more instructions and the multiple applications;
generate a complex task object including commands for completing the complex action, wherein the complex task object provides an order for performing the actions and identifies the multiple applications; and
store the complex task object in a knowledge base to enable a subsequent performance of the complex action.

9. The electronic device of claim 8, wherein, to determine the at least two actions each respective to and based on one of the one or more instructions, the at least one processor is configured to identify, based on at least one of the one or more instructions, an application context or a context-specific action in the knowledge base.

10. The electronic device of claim 8, wherein, to determine the at least two actions each respective to and based on one of the one or more instructions, the at least one processor is configured to:
identify, based on at least one of the one or more instructions, that an application context or a context-specific action is not provided in the knowledge base;
generate a request for information on the application context or the context-specific action; and
receive the information on the application context or the context-specific action in response to the request.

11. The electronic device of claim 10, wherein the request for information on the application context or the context-specific action is displayed in a user interface that provides one or more selectable items for indicating the application context or the context-specific action.

12. The electronic device of claim 8, wherein, to create the complex action, the at least one processor is configured to register at least one action for at least one of the one or more instructions as being dependent on at least one action of another one of the one or more instructions.

13. The electronic device of claim 8, wherein the at least one processor is further configured to:
instruct performance, by a first device, of at least one action of a first one of the one or more instructions; and
instruct performance, by a second device, of at least one action of a second one of the one or more instructions.

14. The electronic device of claim 8, wherein the at least one processor is further configured to:

store, in the complex task object, the complex action for performing the complex task in association with one or more parameters corresponding to the unrecognizable command; and execute the complex action in response to receiving a subsequent command, wherein the subsequent command includes one or more features in common with the unrecognizable command.

15. A non-transitory computer readable medium embodying a computer program, the computer program comprising instructions that when executed cause at least one processor of an electronic device to:

receive an unrecognizable command for performing a complex task, wherein the unrecognizable command cannot be understood or effectively parsed, and wherein the complex task requires use of multiple applications to be completed;

generate a prompt to provide one or more instructions regarding the unrecognizable command;

receive the one or more instructions in response to the prompt, wherein each of the one or more instructions provides information on performing a respective portion of the complex task;

determine at least two actions each respective to and based on one of the one or more instructions provided, wherein each action is capable of performing its respective portion of the complex task, and wherein at least some of the actions are associated with different ones of the multiple applications;

create a complex action for performing the complex task based on the actions for the one or more instructions and the multiple applications;

generate a complex task object including commands for completing the complex action, wherein the complex task object provides an order for performing the actions and identifies the multiple applications; and store the complex task object in a knowledge base to enable a subsequent performance of the complex action.

16. The non-transitory computer readable medium of claim 15, wherein the instructions that when executed cause the at least one processor to determine the at least two actions each respective to and based on one of the one or more instructions further cause the processor to:

identify, based on at least one of the one or more instructions, an application context or a context-specific action in the knowledge base.

17. The non-transitory computer readable medium of claim 15, wherein the instructions that when executed cause the at least one processor to determine the at least two actions each respective to and based on one of the one or more instructions further cause the processor to:

identify, based on at least one of the one or more instructions, that an application context or a context-specific action is not provided in the knowledge base;

generate a request for information on the application context or the context-specific action; and receive the information on the application context or the context-specific action in response to the request.

18. The non-transitory computer readable medium of claim 15, wherein the instructions that when executed cause the at least one processor to create the complex action further cause the processor to:

register at least one action for at least one of the one or more instructions as being dependent on at least one action of another one of the one or more instructions.

19. The non-transitory computer readable medium of claim 15, wherein the instructions when executed further cause the at least one processor to:

instruct performance, by a first device, of at least one action of a first one of the one or more instructions; and instruct performance, by a second device, of at least one action of a second one of the one or more instructions.

20. The non-transitory computer readable medium of claim 15, wherein the instructions when executed further cause the at least one processor to:

store, in the complex task object, the complex action for performing the complex task in association with one or more parameters corresponding to the unrecognizable command; and execute the complex action in response to receiving a subsequent command, wherein the subsequent command includes one or more features in common with the unrecognizable command.

* * * * *